United States Patent
Samuel et al.

(10) Patent No.: US 6,306,800 B1
(45) Date of Patent: Oct. 23, 2001

(54) METHODS OF FRACTURING SUBTERRANEAN FORMATIONS

(75) Inventors: Mathew M. Samuel; Keith I. Dismuke, both of Katy, TX (US); Roger J. Card, Paris (FR); J. Ernest Brown, Katy; Kevin W. England, Longview, both of TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/166,658

(22) Filed: Oct. 5, 1998

Related U.S. Application Data

(63) Continuation of application No. 09/166,658, filed on Oct. 5, 1998, which is a continuation-in-part of application No. 08/727,877, filed on Oct. 9, 1996, now Pat. No. 5,964,295.

(51) Int. Cl.$^7$ .............................. C09K 7/04; E21B 43/16; E21B 43/26
(52) U.S. Cl. ..................... 507/129; 507/240; 507/922; 507/923; 507/933; 507/239; 507/203; 166/279; 166/282; 166/308
(58) Field of Search ................................... 507/104, 129, 507/203, 239, 922, 923, 933, 240; 166/279, 282, 308

(56) References Cited

U.S. PATENT DOCUMENTS

| | | | |
|---|---|---|---|
| 3,292,698 | 12/1966 | Savins | 166/401 |
| 3,760,881 | * 9/1973 | Kiel | 166/308 |
| 3,954,627 | 5/1976 | Dreher et al. | 507/135 |
| 4,061,580 | * 12/1977 | Jahnke | 507/239 |
| 4,113,631 | 9/1978 | Thompson | 252/8.55 |
| 4,148,736 | 4/1979 | Meister | 507/103 |
| 4,418,755 | * 12/1983 | Sifferman | 166/281 |
| 4,432,881 | 2/1984 | Evani . | |
| 4,591,447 | * 5/1986 | Kubala | 507/239 |
| 4,615,825 | * 10/1986 | Teot et al. | 252/356 |
| 4,695,389 | 9/1987 | Kubala | 507/244 |
| 4,725,372 | * 2/1988 | Teot et al. | 507/129 |
| 4,735,731 | * 4/1988 | Rose et al. | 507/203 |
| 4,790,958 | * 12/1988 | Teot | 507/203 |
| 4,806,256 | 2/1989 | Rose et al. | 252/71 |
| 4,975,482 | 12/1990 | Peiffer | 524/535 |
| 5,036,136 | 7/1991 | Peiffer | 524/812 |
| 5,093,448 | 3/1992 | Peiffer | 526/310 |
| 5,258,137 | * 11/1993 | Bonekamp et al. | 252/356 |
| 5,310,002 | * 5/1994 | Blauch et al. | 166/307 |
| 5,551,516 | * 9/1996 | Norman et al. | 166/308 |
| 5,964,295 | 10/1999 | Brown et al. | 166/308 |
| 5,979,555 | 11/1999 | Gadberry et al. | 166/270.1 |
| 5,979,557 | 11/1999 | Card et al. | 166/300 |
| 6,035,936 | 3/2000 | Whalen | 166/308 |
| 6,140,277 | 10/2000 | Tibbles et al. | 507/201 |

FOREIGN PATENT DOCUMENTS

| | | |
|---|---|---|
| 1109356 | 9/1981 | (CA) . |
| 1298697 | 4/1992 | (CA) . |
| 2257697 | 12/1998 | (CA) . |
| 2257699 | 12/1998 | (CA) . |
| 0 835 983 A2 | 4/1998 | (EP) . |
| 1388909 | 11/1972 | (GB) . |
| 2332224 | 6/1999 | (GB) . |
| 2332223 | 1/2000 | (GB) . |
| 94/09852 | 5/1994 | (WO) . |
| 96/31528 | 10/1996 | (WO) . |
| 98/56497 | 12/1998 | (WO) . |

OTHER PUBLICATIONS

M. Samuel et al., "Polymer–Free Fluids for Hydraulic Fracturing", SPE 38622 (1997).
M. M. Samuel et al., "Polymer–Free Fluid for Fracturing Applications," SPE 59478 (1999).
Milton J. Rosen, *Surfactants and Interfacial Phenomena*, 2$^{nd}$ Edition, John Wiley & Sons, New York, 1989, pp. 112–114.
Joseph G. Savins, "A Stress–Controlled Drag–Reduction Phenomenon," SPE 1724 (1966).
B. R. Stewart et al., "Use of a Solids–Free Viscous Carrying Fluid in Fracturing Applications: An Economic and Productivity Comparison in Shallow Completions," SPE 30114 (1994).
Database WPI, Section Ch, Week 9312, Derwent Publications Ltd., London, GB; Class A97, AN 93–098785, XP002090141, & SU 1 724 859 A (Giprovostokneft Des Inst), Apr. 7, 1992, *Abstract*.
Database WPI, Section Ch, Week 9320, Derwent Publications Ltd., London, GB; Class A14, AN 93–165551, XP002090142, & SU 1 735 574 A (Oil Ind Operations Des Res Inst), May 23, 1992, *Abstract*.
Canadian Patent Application No. 2,217,659 including Filing Certificate, Letter to the Commissioner of Patents, Ottawa–Hull, Canada dated Jun. 23, 2000, Voluntary Amendment dated Aug. 16, 2000, Notice of Allowance dated Sep. 25, 2000, and Amendment After Allowance dated Oct. 24, 2000.

* cited by examiner

*Primary Examiner*—Jill Warden
*Assistant Examiner*—LaToya Cross
(74) *Attorney, Agent, or Firm*—Douglas Y'Barbo; Thomas O. Mitchell

(57) ABSTRACT

The improved recovery of hydrocarbons from subterranean formations by fracturing and matrix acidizing a subterranean formation is accomplished. Well treatment fluids having a viscoelastic surfactant fluid containing worm like micelles are useful to improve recovery of hydrocarbons and limit the loss of fracturing fluid into the formation fracture face. The viscolastic surfactant-based fracturing fluids of the present Invention are stable across a wide pH spectrum, allowing them to be used for fracturing treatments at low pH, as well as matrix acidizing treatments. In addition, the stability of these fluids is enhanced in the presence of organic anions. Two-stage fracturing treatments comprised of a viscoelastic surfactant-based fracturing fluid and a polymer-based system, wherein the two fluids are either blended or pumped into the formation sequentially (the polymer last) are also presented.

27 Claims, 16 Drawing Sheets

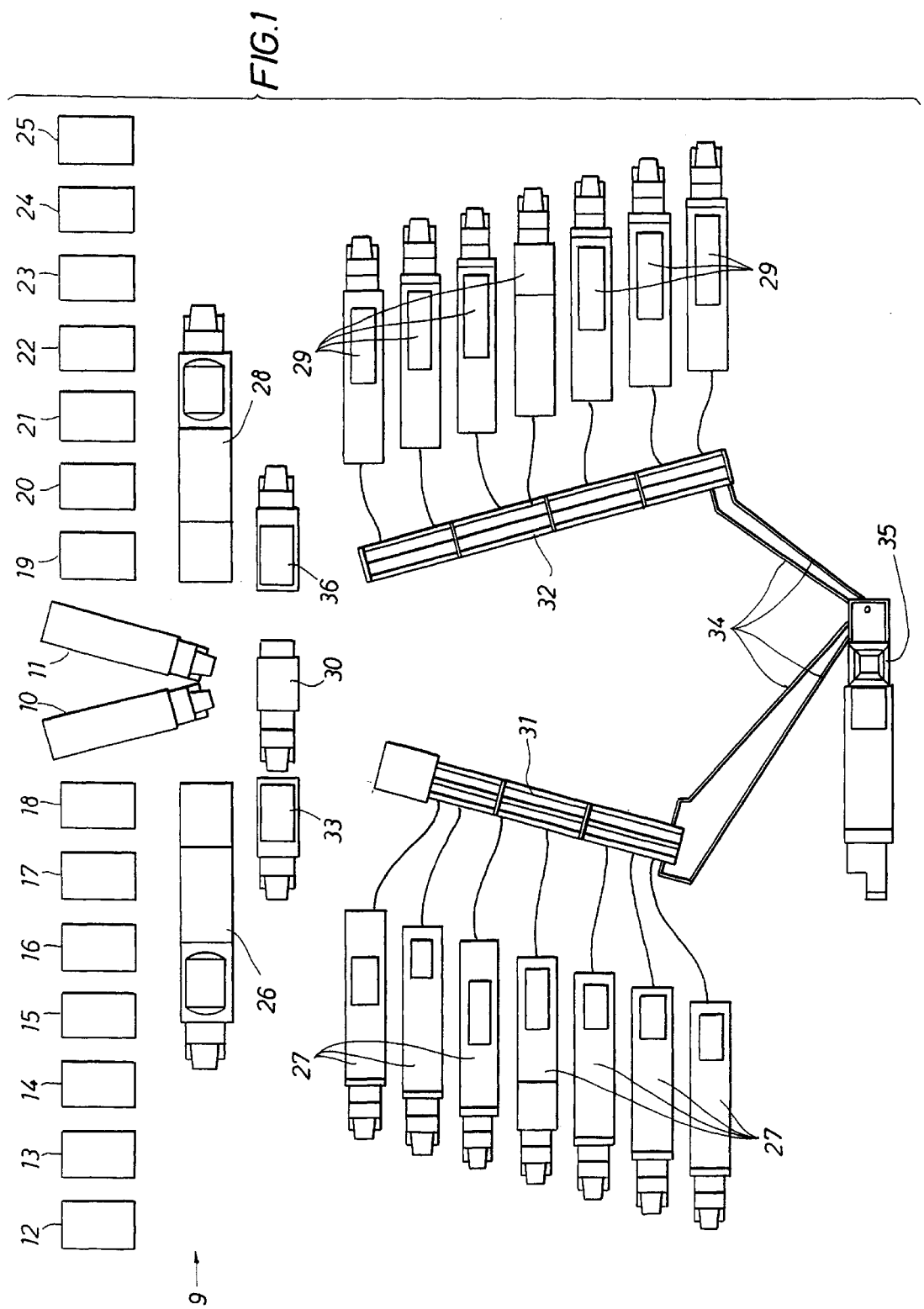

METHODS OF FRACTURING SUBTERRANEAN FORMATIONS

This is a continuation of U.S. patent application Ser. No. 09/166,658 filed on Oct. 5, 1998, which is a continuation-in-part of U.S. patent application Ser. No. 08/727,877 filed on Oct. 9, 1996, and issued as U.S. Pat. No. 5,964,295 on Oct. 12, 1999. This application is related to U.S. patent application Ser. No. 09/219,948 filed on Dec. 23, 1998, and to U.S. patent application Ser. No. 09/256,980 filed on Feb. 23, 1999. This Application, U.S. Pat. No. 5,964,295, and the related applications have the same assignee.

FIELD OF THE INVENTION

The invention relates to the recovery of hydrocarbons from subterranean formations. More particularly, the invention relates to novel fracturing methods useful in increasing hydrocarbon production, limiting connate water production, resisting fracturing fluid loss into the subterranean formation, and reducing equipment requirements in mixing and pumping fracturing fluids.

BACKGROUND OF THE INVENTION

In the recovery of hydrocarbons from subterranean formations it is common practice, particularly in formations of low permeability, to fracture the hydrocarbon-bearing formation to provide flow channels. These flow channels facilitate movement of the hydrocarbons to the wellbore so that the hydrocarbons may be pumped from the well.

In such fracturing operations, a fracturing fluid is hydraulically injected into a wellbore penetrating the subterranean formation and is forced against the formation strata by pressure. The formation strata or rock is forced to crack and fracture, and a proppant is placed in the fracture by movement of a viscous fluid containing proppant into the crack in the rock. The resulting fracture, with proppant in place, provides improved flow of the recoverable fluid, i.e., oil, gas or water, into the wellbore.

Fracturing fluids customarily comprise a thickened or gelled aqueous solution which has suspended therein "proppant" particles that are substantially insoluble in the fluids of the formation. Proppant particles carried by the fracturing fluid remain in the fracture created, thus propping open the fracture when the fracturing pressure is released and the well is put into production. Suitable proppant materials include sand, walnut shells, sintered bauxite, or similar materials. The "propped" fracture provides a larger flow channel to the wellbore through which an increased quantity of hydrocarbons can flow, thereby increasing the production rate of a well.

A problem common to many hydraulic fracturing operations is the loss of fracturing fluid into the porous matrix of the formation. Fracturing fluid loss is a major problem. Hundreds of thousands (or even millions) of gallons of fracturing fluid must be pumped down the wellbore to fracture such wells, and pumping such large quantities of fluid is very costly. The lost fluid also causes problems with the function or technique of the fracture. For example, the undesirable loss of fluid into the formation limits the fracture size and geometry which can be created during the hydraulic fracturing pressure pumping operation. Thus, the total volume of the fracture, or crack, is limited by the lost fluid volume that is lost into the rock, because such lost fluid is unavailable to apply volume and pressure to the rock face.

Hydraulic fracturing fluids usually contain a hydratable polymer which thickens the fracturing fluid when it is chemically crosslinked. Such a polymer typically is hydrated upon the surface of the ground in a batch mix operation for several hours in a mixing tank or other container, and crosslinked over a period of time to viscosify the fluid so that it is capable of carrying the proppant into the fracture. Natural polymers including polysaccharides, such as guar, have been used in this way.

One problem associated with the use of polysaccharides as viscosifiers for fracturing fluids is that the hydration and crosslinking process is time consuming and requires expensive and bulky equipment at the wellsite. Such equipment, and the associated personnel to operate it, significantly increase the cost of the fracturing operation. Further, once the polysaccharide is hydrated and crosslinked, it is not feasible to add additional polysaccharide to the solution, or to regulate the concentration of polysaccharide in the fracturing fluid in real time during the pumping of the job.

Another difficulty is that a large number of supplementary additives are required to use polysaccharides successfully, including for example: bactericides, antifoam agents, surfactants to aid dispersion, pH control agents, chemical breakers, enzymatic breakers, iron control agents, fluid stabilizers, crosslinkers, crosslinking delay additives, antioxidants, salt(s) and the like. These materials must be formulated correctly (which can be a difficult task), transported to the jobsite, and then pumped and metered accurately during the execution of the fracturing treatment.

Another disadvantage associated with such polysaccharide based fracturing fluids is that, when they are used as viscosifiers, they contain materials that concentrate in the formation during the course of the hydraulic fracturing treatment, reducing the production of hydrocarbons after the fracturing event. For example, during the course of a treatment, water from the fracturing fluid leaks into the formation leaving the polysaccharide behind. Guar concentrations in the fracture sometimes increase by as much as a factor of twenty as compared to the concentration of guar in the actual fracturing fluid.

Many fracturing fluid materials, therefore, when used in large concentrations, have relatively poor "clean-up" properties, meaning that such fluids undesirably reduce the permeability of the formation and proppant pack after fracturing the formation. Detailed studies of polysaccharide recovery in the field after hydraulic fracturing operations indicate that more than sixty percent of the total mass of polysaccharide pumped during the treatment maybe left in the fracture at the time gas or oil begins to be produced in commercial quantities. Poor clean-up is a problem.

Well productivity after fracturing increases dramatically as the amount of polysaccharide returned to the surface increases. Anything that reduces the permeability of the propped fracture to hydrocarbons is usually detrimental to the production of hydrocarbons from the well.

Other polysaccharides, such as hydroxyethylcellulose ("HEC") are sometimes believed to provide improved clean-up as compared to polysaccharide based materials; however, HEC is known to form undesirable clumps or "fish eyes" during mixing. Further, HEC is limited to lower formation temperatures, and thus is not preferred for a wide variety of fracturing conditions.

To overcome the limitations of fracturing with natural or synthetic polysaccharides, some have suggested using relatively expensive materials as viscosity enhancers, such as viscoelastic surfactants. Fluids prepared from such materials are capable of carrying proppant into a fracture, but do not have many of the limitations of polysaccharide materials.

Viscoelastic surfactants form micelles that are able to proceed into the reservoir rock, and then break up, allowing the components to be removed. Therefore, breaker materials are not customarily required, which reduces cost and improves cleanup of the fluid from the formation.

The problems encountered with viscoelastic surfactant based fluids in the past, however, include relatively large fluid losses into formations in which they have been used. Micellar-type viscoelastic fluids have not been utilized widely in fracturing treatments of relatively low permeability formations because, among other reasons, materials have not been available that would enable the maintenance of a desired viscosity at temperatures above about 130° F., which is less than the temperature at which most hydraulic fracturing operations are conducted.

Until recently, the use of such viscoelastic surfactant fluids has been restricted largely to operations in shallow, high permeability to control sand production either in conventional gravel packing operations or involving fracturing very close to the wellbore, such as in so called "frac-and-pack" type operations. The cost of viscoelastic components has rendered them too expensive, in most cases, to utilize in normal fracturing treatments of a large size and high volume.

Use of viscoelastic surfactant fracturing fluids has been limited in many cases to formations that contain clays or otherwise need soluble salts for the specific purpose of inhibiting hydration of the clay materials. If such clay materials are allowed to hydrate, problems can occur, thus the need exists for a soluble salt that can inhibit the hydration of such clay-type materials. U.S. Pat. No. 5,551,516 to Norman et al. ("Norman") discloses generally fracturing stimulation of high permeability formations, and more specifically, the use of surfactant based fracturing fluids. However, Norman does not teach this invention, and in particular, application to low permeability formations. Further, Norman teaches the use of an organic activator, such as, for example sodium salicylate, which is not required in this invention.

Notably, low permeability formations present different fluid loss control challenges that typically are not addressed in fluids designed to work on high permeability formations. For example, solid fluid-loss-control additives, which are very effective in high permeability formations, have little or no utility in hydrocarbon zones of low permeability.

U.S. Pat. Nos. 4,725,372 and 4,615,825 (collectively "Teot") specifically teaches and defines fluids used in treating the wellbore. This requires the use of heavy brines (e.g. greater than 12–15 lbs/gallon of brine). Heavy brines generally are not desirable in hydraulic fracturing of low permeability formations. Heavy brines can minimize fluid returns after the hydraulic fracturing treatment, adversely affecting cleanup and well productivity.

For example, fluid systems that operate effectively in ammonium chloride salts many times are frequently not compatible with much heavier calcium chloride, calcium bromide and zinc salt derived brines that typically are required for wellbore treatments. Therefore, fluids of a viscoelastic type designed for wellbore applications have not been directly useful in the past as reservoir treating fluids (sand control, acid fracturing, hydraulic fracturing, matrix acidizing, remedial scale inhibition treatments and the like) and vice-versa.

A need exists for a surfactant fluid that economically can increase hydrocarbon production, limit connate water production, resist fluid loss into the formation, and preserve the component balance of the fluid mixture. A fluid that can achieve the above while improving the precision with which fluids are delivered, and reduce equipment or operational requirements, would be highly desirable.

SUMMARY OF THE INVENTION

It has been discovered that a viscoelastic surfactant fluid may be used advantageously in many different fracturing applications to achieve results not previously believed possible using such fluids. In particular, this invention is effective in increasing hydrocarbon production following hydraulic fracturing. Further, these methods may be employed to limit connate water production after fracturing, which assists in improving the percentage of hydrocarbons recovered once a well is put back on production after fracturing.

Other advantages of the methods of this invention include that it may assist in resisting fracturing fluid loss into the subterranean formation, thereby saving money and preserving the component balance of the fracturing fluid mixture. It is also an advantage of this invention that it is possible to reduce the equipment requirements in mixing and pumping fracturing fluids at the wellsite, and improve operational efficiency in fracturing wells. This invention can be utilized to save operating expense and to improve the precision with which fluids may be delivered into the wellbore during fracturing.

In one embodiment, the invention comprises a method of reducing fluid loss into a relatively low permeability formation during fracturing by providing a viscoelastic surfactant based fracturing fluid containing worm like micelles comprising a thickening amount of a viscoelastic surfactant comprising a surfactant ion having a hydrophobic first portion chemically bonded to an ionic hydrophilic second portion.

The fluid contains micelles, the micelles having a structure that contributes to the increased viscosity of the fluid, further wherein the worm like micelles are capable of selectively forming, changing structure or disbanding depending upon the polarity of the surrounding fluid in the formation.

The fluid is pumped, for example, into a relatively low permeability formation at a pressure sufficient to fracture the formation, the relatively low permeability formation having a fracture face engaged by the fluid during pumping. Typically, the formation comprises at least one largely hydrocarbon-bearing zone and at least one largely aqueous zone.

The viscosity of the fluid within the hydrocarbon-bearing zone is decreased, while the viscosity of the fluid within the aqueous zone is maintained. Further, the amount of viscous fluid lost into the fracture face is reduced, whereby a greater volume of viscous fluid is available for fracturing the relatively low permeability formation, and increasing the ratio of fracture size per unit volume of viscous fluid pumped into the wellbore.

In other methods, the invention includes enhancing the cleanup of viscoelastic surfactant based fracturing fluid from the well, or in some cases flowing back fluid from the wellbore, wherein hydrocarbon production upon flowing back fluid from the wellbore is increased.

The viscosity of fluid within at least one aqueous zone of the subterranean formation is maintained by presence of worm like micelles in that zone of the formation, and viscosity of the fluid within at least one hydrocarbon-bearing zone is depleted by the disbanding or structural change of the micelles.

In many cases, the maintenance of worm like micelles within aqueous zones contributes to an increase in hydrocarbon production from the wellbore upon flowing back fluid from the wellbore following fracturing.

In another embodiment, a method of reducing the production of water from a subterranean formation subsequent to fracturing the subterranean formation is shown. This method is directed to providing an aqueous viscoelastic surfactant based hydraulic fracturing fluid comprising an aqueous medium, an effective amount of a water soluble salt, and an effective amount of a thickener in the fluid, generating a viscous fluid comprising worm-shaped micelles; and pumping the viscous fluid comprising micelles through a wellbore and into a formation at a pressure sufficient to fracture the formation. The formation may have an aqueous zone containing a significant amount of water, and a hydrocarbon zone. Micelles within the viscous fluid of the hydrocarbon zone undergo a structural change or break down, thereby decreasing the viscosity of the fluid within the hydrocarbon zone to form a thinned fluid. The thinned fluid is then removed from the hydrocarbon zone of the formation. The worm like micelles in the water zone are more stable, and a reduction in the amount of water produced from the formation during the removing step is observed. Further, the advantage of increasing the production of hydrocarbons from the subterranean formation is realized.

In another method, the formation is fractured by providing an aqueous viscoelastic surfactant based hydraulic fracturing fluid including a thickener comprising an aqueous medium and an effective amount of a water soluble salt, and at least one thickener. The thickener is an amine or a salt of an amine.

This method includes the steps of generating a viscous fluid comprising worm like micelles, pumping the viscous fluid comprising such micelles through the wellbore and into the formation at a pressure sufficient to fracture the formation. The micelles enter the water zone and the hydrocarbon zone and a fracture is accomplished. The micelles undergo a structural change or disband within the fluid in the hydrocarbon zone, thereby decreasing the viscosity of the fluid within the hydrocarbon zone. The well is flowed back, and hydrocarbons are produced from the subterranean formation. Significantly, there is a reduction in the amount of water produced from the subterranean formation during the removing step.

In one method, a procedure of fracturing a subterranean formation below the surface of the ground is disclosed using a viscous fracturing fluid that does not require prolonged hydration above the ground surface, resulting in a more efficient and less costly procedure. In this way, the fluid is prepared by simply continuously metering a concentrate at the ground surface into a blender, the concentrate comprising a thickening amount of a viscoelastic surfactant comprising a surfactant ion having a hydrophobic first portion chemically bonded to an ionic hydrophilic second portion. Further, a counter-ion having a component capable of associating with the surfactant ion and forming a viscoelastic fluid and a functionally effective amount of water are added. Mixing of the concentrate with the counter-ion and water above the ground surface is performed at the blender to instantly form a viscous fracturing fluid, which is simultaneously pumped below the surface of the ground into a wellbore.

BRIEF DESCRIPTION OF THE DRAWINGS

FIG. 1 shows a typical layout of the standard equipment used in the prior art on a large land-based fracturing job, which includes mixers to hydrate and contain the hydratable polymer;

FIG. 16A shows a typical guar-based fracturing treatment, characterized by a poor clean-up after flowback; FIG. 16B shows essentially complete clean-up with ClearFRAC (or VES of the present invention); FIG. 16C shows a fracture treatment in which VES and guar are used sequentially, VES followed by guar, so that the VES is easily removed from the fracture tip, while the guar is also easily removed from the portion of the fracture in proximity to the wellbore, therefore resulting in optimum fracture clean-up at low cost (the guar is assumed to be cheaper than the VES).

Figure 18:
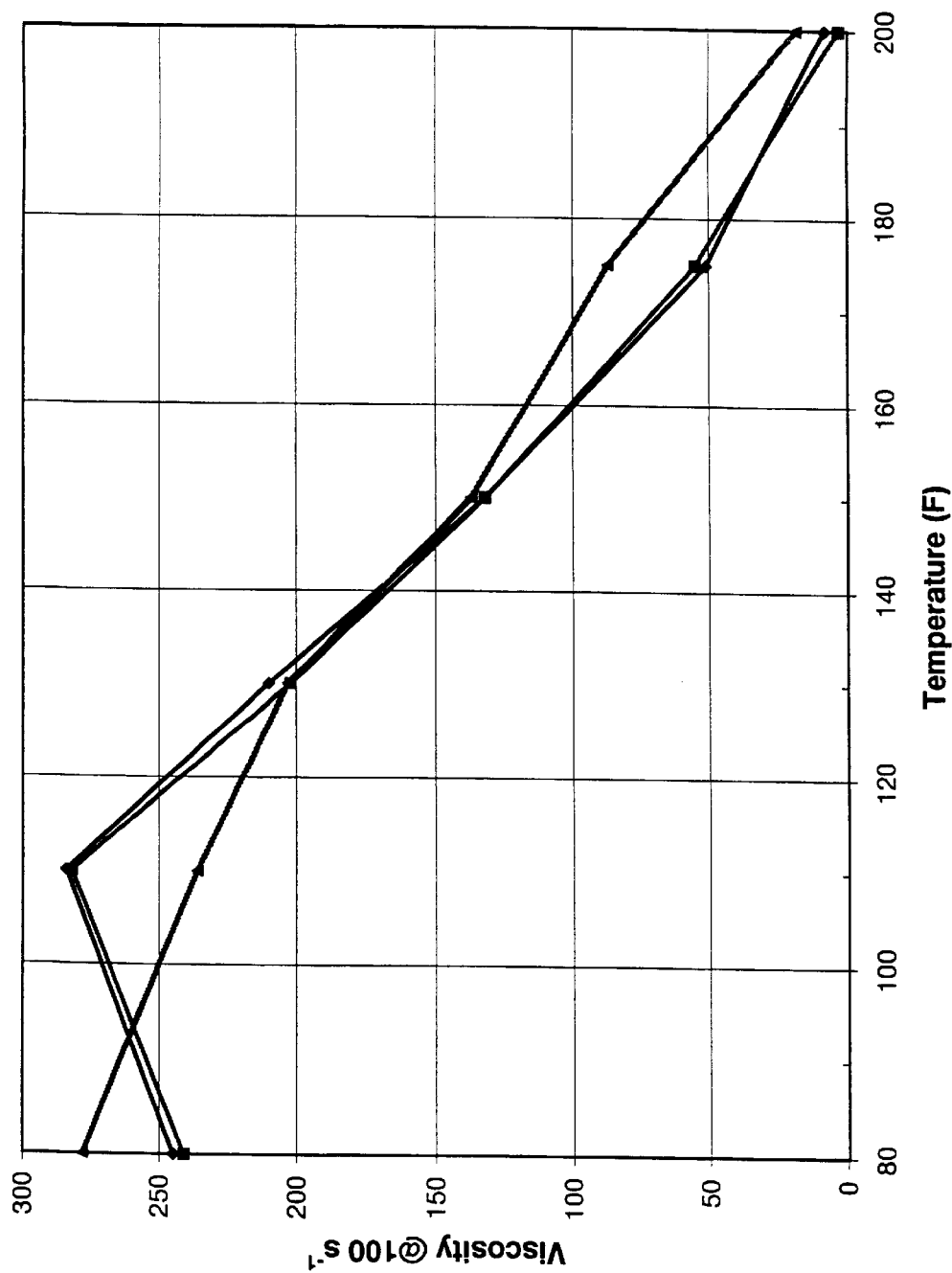

FIG. 18 shows the stability of VES-based fluids (3%) in the presence of various ions in freshwater (KCl, diamonds; $NH_4Cl$, squares), compared with a VES fluid prepared using seawater.

Figure 19:
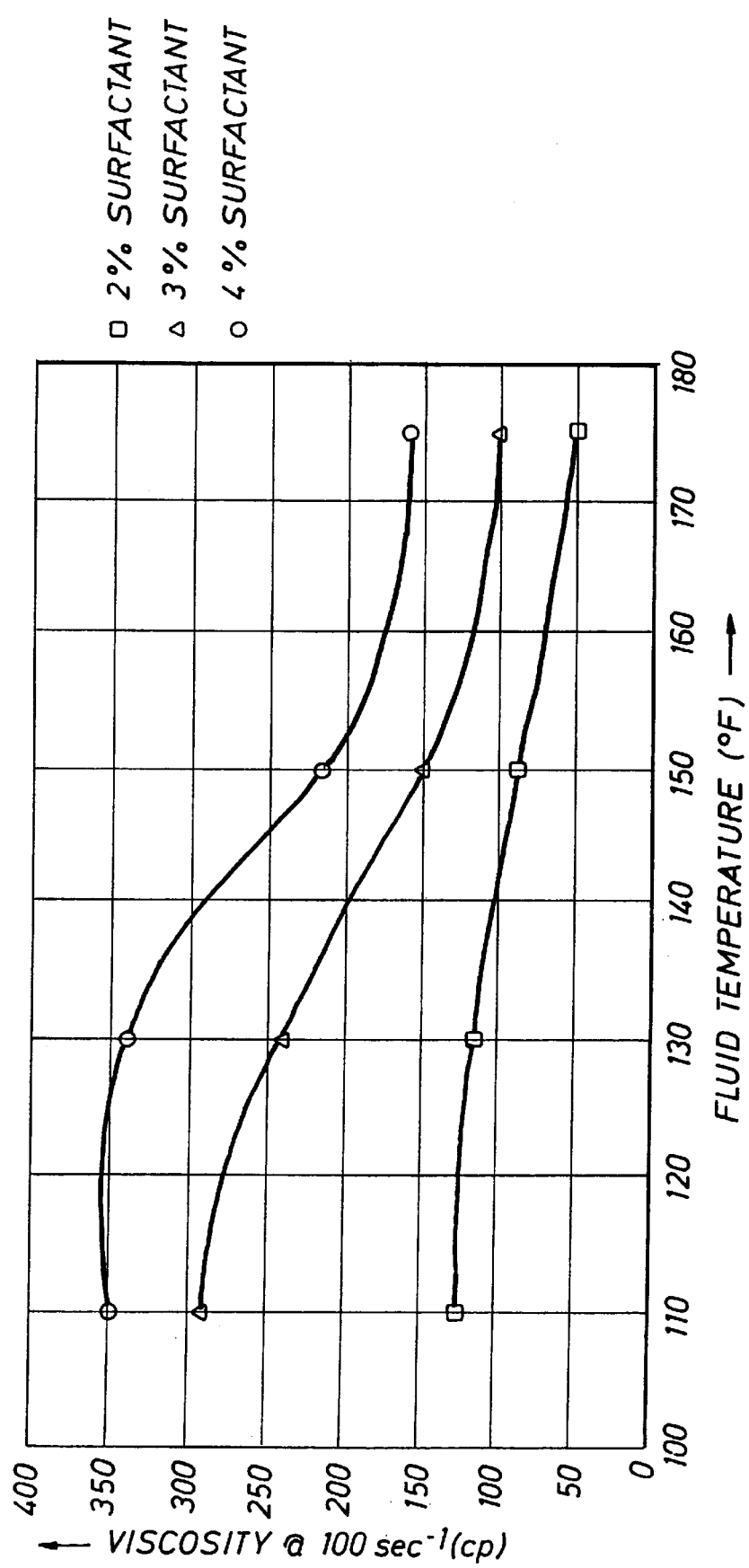

FIG. 19 is a plot of the temperature dependence of the viscosity of the surfactant-based fracturing fluid prepared without the addition of sodium salicylate as described in Example 1.

Turning now to FIG. 1, a fracturing configuration 9 for a land-based fracture typically includes the equipment shown. The proppant is contained in sand trailers 10 and 11. Further, water tanks 12, 13, 14, 15, 16, 17, 18, 19, 20, 21, 22, 23, 24, and 25 are shown at the top of the figure. Water is pumped from such tanks into the mixers 26 and 28. Smaller fracturing jobs would use only one such mixer. Pump trucks 27 and 29 are shown on either side of FIG. 1, and they contain on their trailers the pumping equipment needed to pump the final mixed and blended slurry downhole.

Sand hopper 30 is available to receive sand from the sand trailers and distribute it into the mixers as needed. The mixers are filled with polysaccharide in a typical prior art fracturing operation, and the polymer then is hydrated using water from the water tanks. This process of hydrating the polysaccharide takes some time, and using the prior art methods that utilize guar or other hydratable polymers, the polysaccharide polymer cannot be pumped from the mixer until it is fully hydrated and ready to pump downhole. Once the polysaccharide is fully hydrated, it is no longer possible to increase viscosity by adding more polysaccharide. Should high fluid viscosity be required, the rate of polysaccharide addition from the pre-mixed slurry would be the only available means of increasing the viscosity. This would be very inefficient, however, because in many cases fluid already prepared, but of incorrect viscosity, would be discarded or unfit for use.

During fracturing, the hydrated polysaccharide is pumped from the mixers to the blenders 33 and 36, where it is blended with the proppant and then transferred to manifolds 31 and 32, respectively. The fluid containing proppant is then transferred to the pump trucks, and routed back at high pressure through treating lines 34 to rig 35, and then pumped downhole.

Figure 1A:
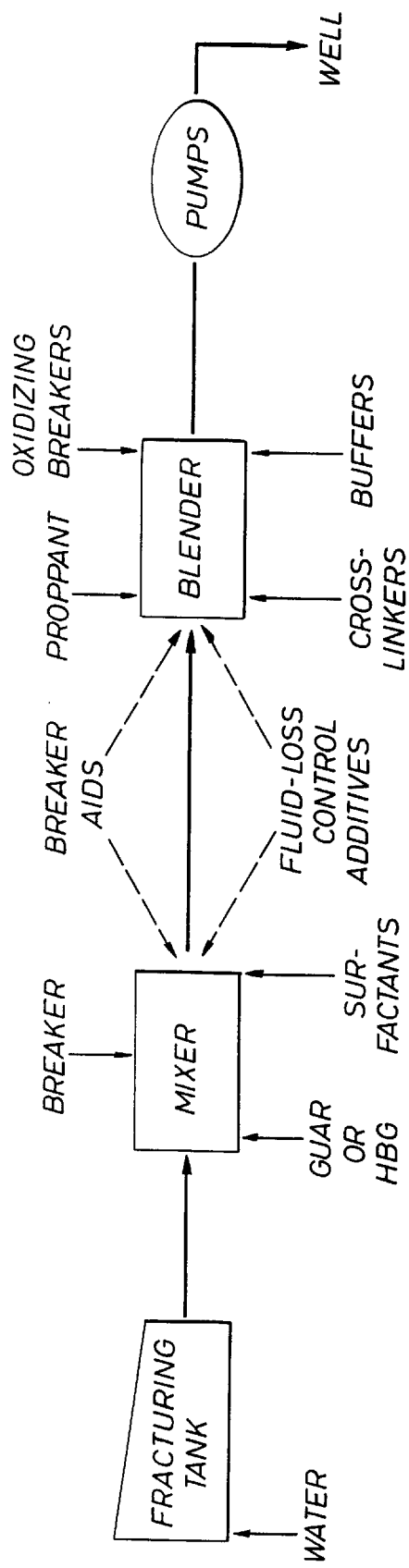
FIG. 1A illustrates the prior art methods of polysaccharide based fracturing, which includes a mixer and numerous additives, breakers, etc., needed to cause the polysaccharide to perform.

FIG. 1A shows a typical prior art method in which water and polysaccharide are transferred from a frac tank to a mixer and then to a blender, while various additives are added along the path of the material.

Figure 2:
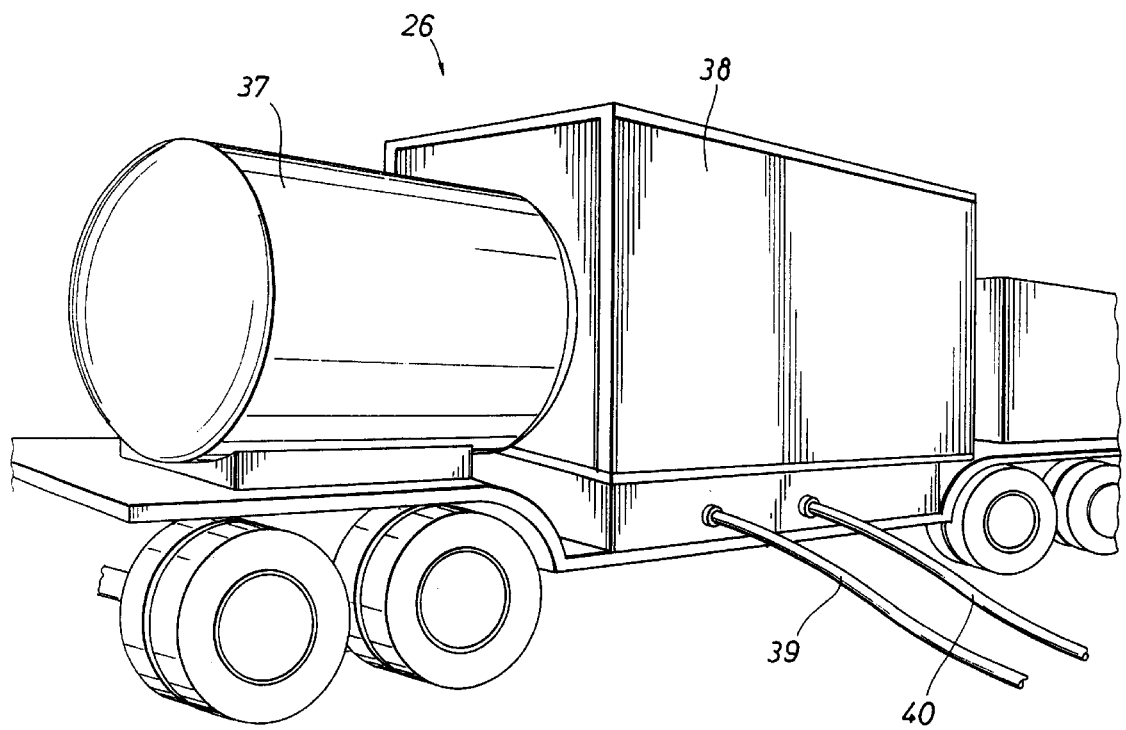
FIG. 2 depicts a standard mixer (the particular mixer shown is Schlumberger's "Precision Continuous Mixer" or "PCM")(PCM is a trademark of Schlumberger Technology Corporation) used to hydrate polysaccharides on a wellsite prior to pumping the polysaccharides to a blending unit where proppant is added prior to pumping into the wellbore.

FIG. 2 shows a mixer 26 which comprises a slurry gel tank 37 and mixing compartments 38. The mixing compartments contain paddle blades (not shown) which are used to slowly agitate the polysaccharide to allow it to hydrate and thicken prior to addition of crosslinker and other additives and then pumping it out discharge line 39 to blending equipment. Suction line 40 carries water for mixing with the polysaccharide.

Figure 3:
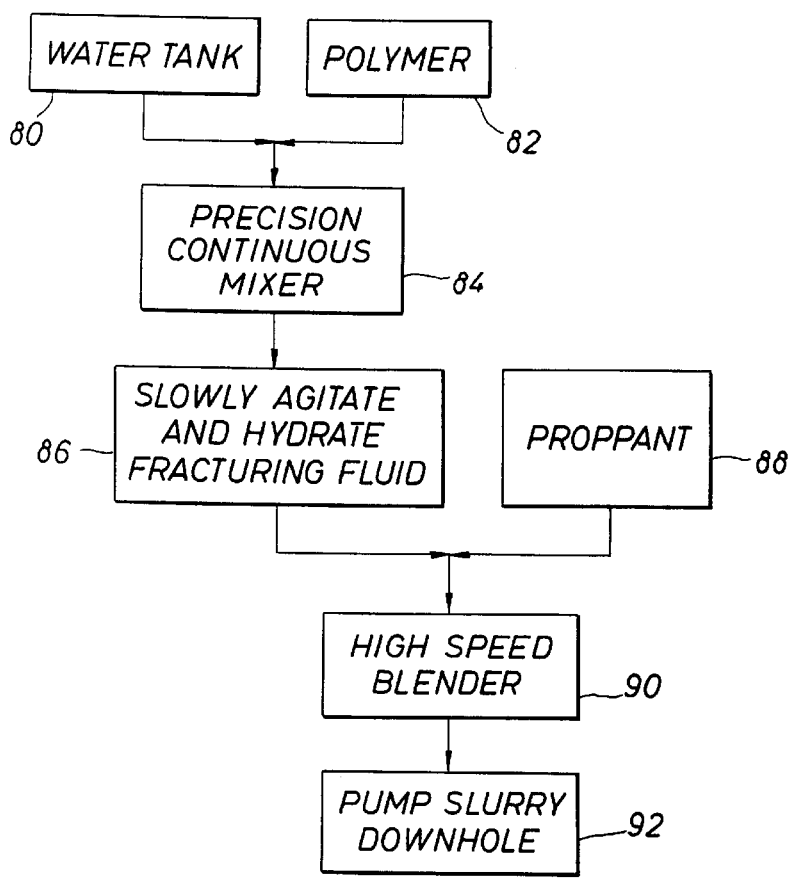
FIG. 3 is yet another schematic representation of the flow of material in above ground equipment and into the wellbore in the prior art.

In FIG. 3, the prior art methods of pumping polysaccharides hydratable are shown in which fluid from water tank 80 is mixed with polymer (or polysaccharide) 82 and pumped into precision continuous mixer 84. The next step is the relatively slow agitation and hydration of the mixture followed by addition of crosslinker and other additives to convert the polysaccharide slurry into a viscous fracturing fluid, followed by mixing with proppant 88. This resulting slurry is then transferred to the high speed blender 90 and pumped downhole at step 92.

Figure 4:
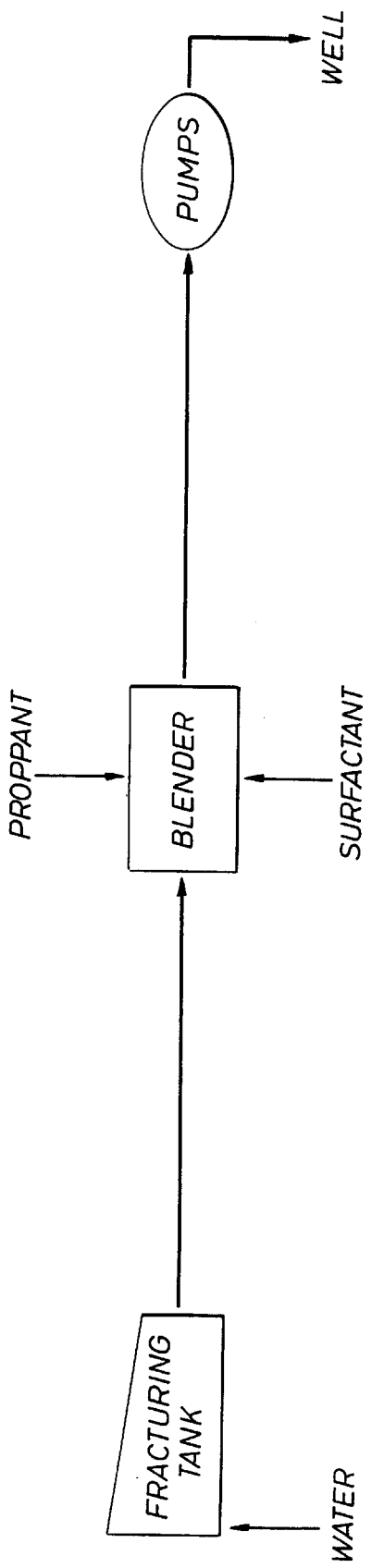
FIGS. 4 and 4A illustrate the flow of material that may be achieved using one invention of this application.
Figure 4A:
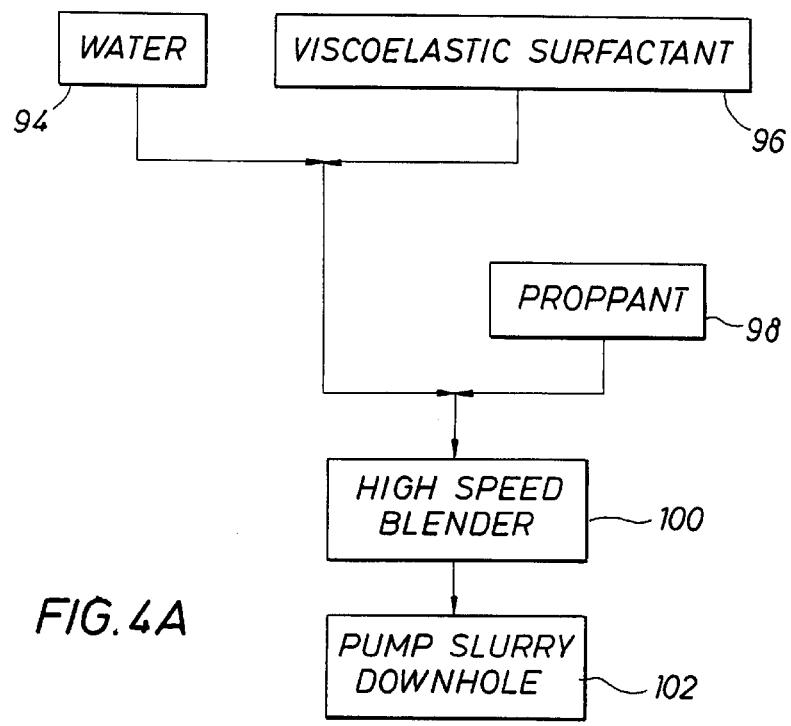

FIGS. 4 and 4A show the path of material using one of the inventions disclosed herein. In FIG. 4A, water 94 is mixed with viscoelastic surfactant 96 and then mixed with proppant 98 where is proceeds into a blender 100 to be pumped downhole. This process may be accomplished, for example, using a concentrate of surfactant which can be taken to a wellsite and almost immediately hydrated and blended to go downhole, without the slow agitation and slow hydration used in some prior art methods. FIG. 4 shows an invention method of this invention wherein a mixer such as the PCM is not needed, but instead fracturing fluid is mixed with proppant and blended substantially at the same time that it is pumped downhole, without prolonged hydration times.

Figure 5:
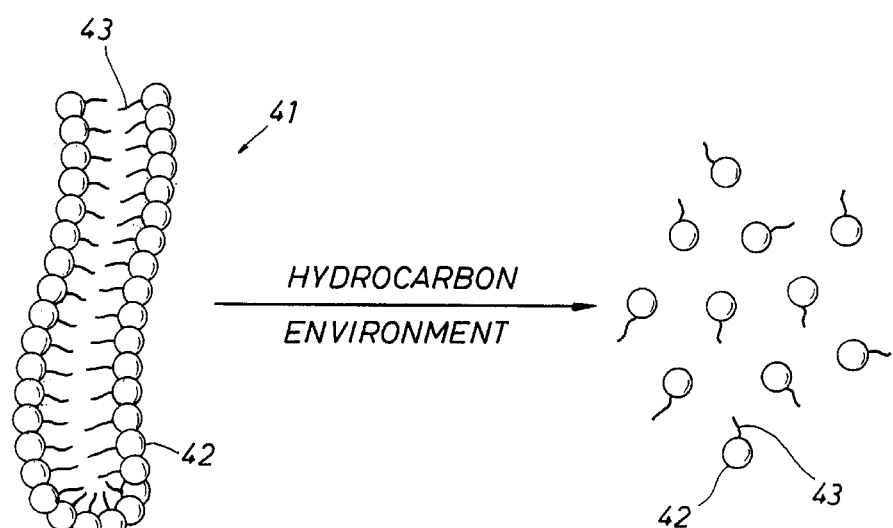
FIG. 5 shows an illustration of the structure of a micelle of viscoelastic surfactant material as it exists intact in an aqueous environment and in disbanded form after contacting a hydrocarbon medium.

In FIG. 5, a micelle of surfactant is shown in a typical configuration with hydrophilic head portions 42 and hydrophobic tail portions 43. The hydrophilic portions, when in an aqueous (polar) environment, tend to form an outer layer, while the hydrophobic portions are directed inwards away from the aqueous environment. In the presence of sufficient amount of hydrocarbons, this worm like micellar structure becomes unstable, reverting to a micellar structure that is not conducive to forming a viscous fluid, or to individual molecules as shown in the figure.

Figure 6:
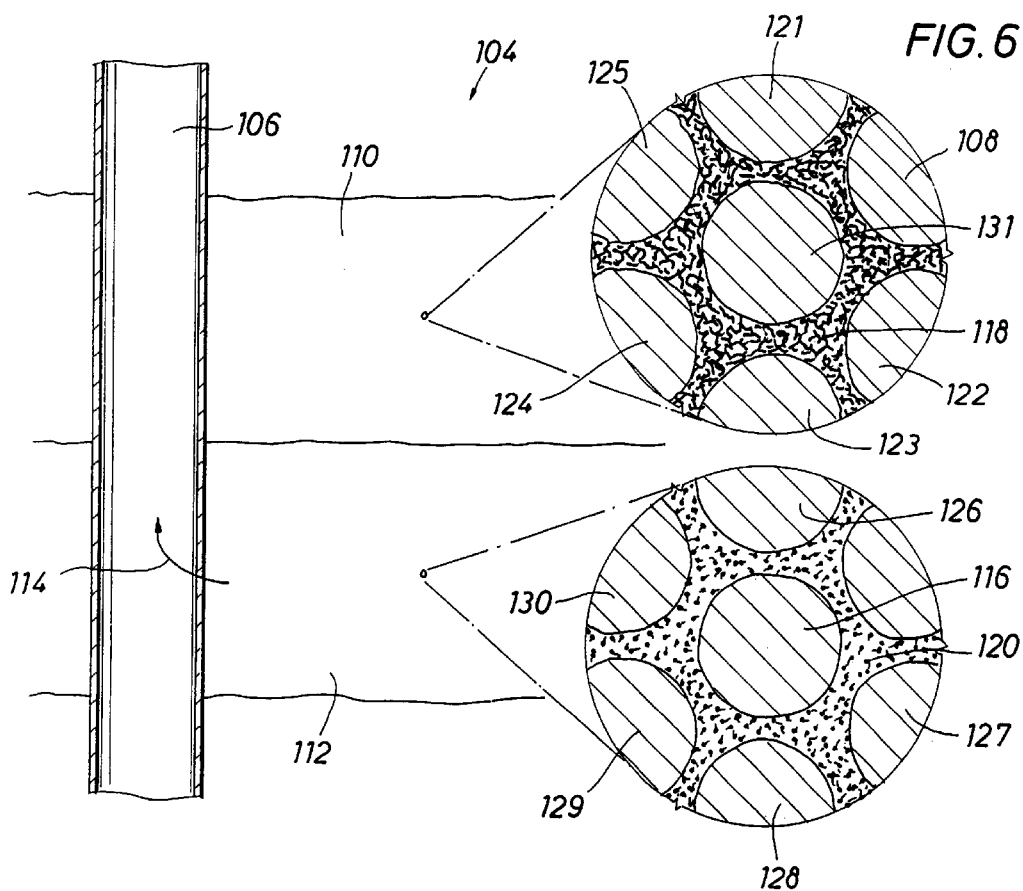
FIG. 6 demonstrates how micelles exist in the water bearing formation, and remain in worm like micellar form, thereby inhibiting water flow from the aqueous zone, while the micelles themselves degrade into smaller components and facilitate production back into the wellbore of the fluids within the hydrocarbon bearing zone.

FIG. 6 depicts a fractured subterranean formation 104 comprising an aqueous zone 110 separating a hydrocarbon zone 112. Wellbore 106 receives hydrocarbons along direction arrow 114 from the hydrocarbon zone 112. A close-up examination of the pore structure is seen for both the aqueous zone (upper) and hydrocarbon zone (lower). Sand grains 121, 122, 123, 124, 125, 108, 131, 126, 116, 127, 128, 129, 130, are shown as deposited into the formation by the fracturing fluid. Worm like micelles 118 are seen in the space between the sand grains in the aqueous zone as a network of micelles which impede connate water flowback into the wellbore 106. The micelles within the hydrocarbon zone are dispersed into micellar subunits 120, as seen in the lower portion of FIG. 6.

Figure 7:
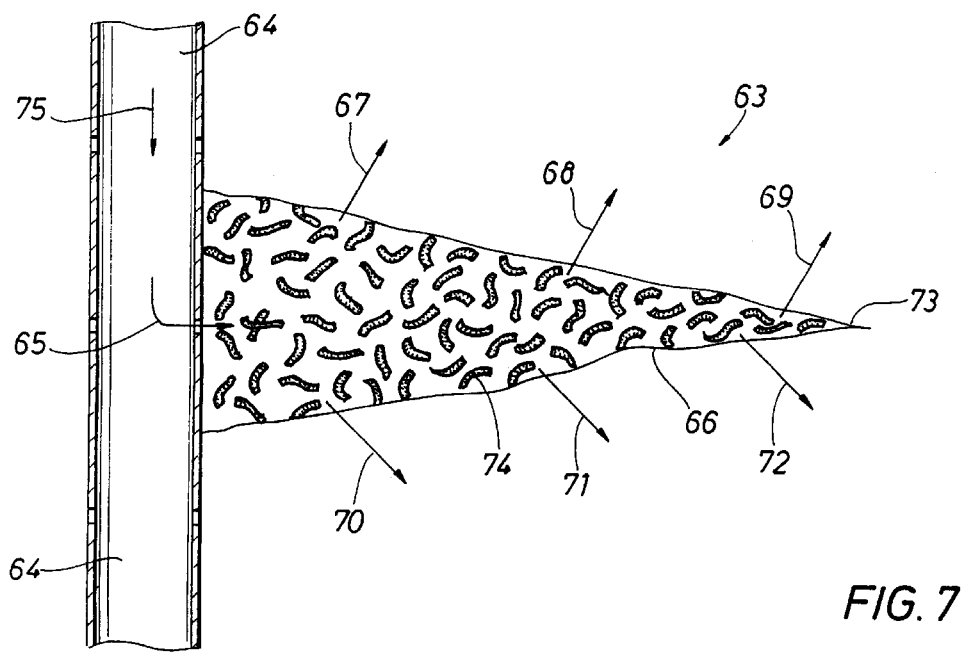
FIG. 7 illustrates how micelles are used to assist in preventing undesirable loss of the aqueous component of the fluid into the fracture face of a relatively low permeability formation.

In FIG. 7, an illustration of the benefit of micelles in controlling fluid loss is seen. Subterranean fracture 63 is shown growing outward from wellbore 64 which uses fracture fluid flow direction 75 to facilitate fracture fluid flow into the formation at 65. Fluid loss direction arrows 67–72 indicate the direction of fluid loss into the fracture face. In the case of viscoelastic surfactants, this has been found to occur by a mechanism that preserves and enhances the fracture volume.

DESCRIPTION OF THE PREFERRED EMBODIMENTS

The description and examples are presented solely for the purpose of illustrating the preferred embodiments of the invention and should not be construed as a limitation to the scope and applicability of the invention.

The invention(s) relate to novel fracturing methods useful in, among other things, increasing hydrocarbon production, limiting connate water production, resisting fracturing fluid loss into the subterranean formation, and reducing equipment requirements in mixing and pumping fracturing fluids.

The problem of excessive fluid loss has been known to detrimentally affect a well when a significant (greater than about 30%) portion of the aqueous fluid is lost into the fracture face, leaving behind the larger polymer molecules which do not diffuse into the pores of the rock. When the ratio of aqueous fluid to viscosifier is changed by such large fluid losses, problems in maintaining the integrity of the fluid occur. This is particularly a problem in relatively low permeability formations, in which large surface areas of rock fracture face are exposed to the fluid. In conventional guar based fluids, only water leaks off into the formation.

In relatively low permeability formations, e.g. less than about 10 millidarcies (hereafter "md"), where hydrocarbons are present, solid fluid-loss-control additives and fluid compositions usually show very little or no effect on fluid loss rate. Leakoff in such instances is controlled by the viscosity of the leakoff fluid. That viscosity is essentially the same as the viscosity of water for all polysaccharides because the polymer is filtered out at the surface of the rock face into which fluid loss is occurring.

It has been found that the leakoff rate of viscoelastic surfactant based fluids into similar rock is much lower than that of the polysaccharide based fluids. While this invention and its claims are not bound by any particular mechanism of operation or theory, it appears that (a) the micellar structure which provides fluid viscosity is sufficiently small so that it can move into the pore structure of the rock thereby maintaining the high viscosity of the leak off fluid and controlling total leakoff, or (b) the "equilibrium controlled" micelles break at the face of the rock producing the individual surfactant molecules which are too small to be filtered out on the rock face and therefore migrate into the pore structure of the rock where they are capable of reassembling into micelles and decreasing fluid mobility (due to regained viscosity or due to the energy required to break the micelles before the fluid viscosity can decrease and the fluid migrates deeper into the rock structure).

The use of polysaccharide fluids for hydraulic fracturing is further limited by the physical processes that control cleanup after the hydraulic fracturing treatment in low to medium permeability formations. After a hydraulic fracturing treatment the well is "turned around", that is, the piping used during the treatment is disconnected from the wellbore, new piping is put in place to allow production of the fracturing fluids and formation fluids back to the surface through a choke at a designed flow rate. This flow rate is set based on a number of criteria including consideration of proppant back production. The total flow rate at the surface depends on the rate of flow of fluids from the fracturing treatment out of the fracture and up the wellbore, plus the rate of migration of formation fluids (hydrocarbons and connate water) into the fracture and then into the wellbore. With time, the rate of production of formation fluids, including connate water, increases until it is equal to or very nearly equal to the flow rate at the surface. At this point in time clean up of the fracture length essentially stops. Studies have shown that connate water production rate can be the limiting factor in determining guar recovery, effective fracture half length and well productivity.

The problem of excessive fluid loss has been known to detrimentally affect a well when a significant (greater than about 30%) portion of the aqueous fluid is lost into the fracture face, leaving behind the larger crosslinked polysaccharide molecules which do not diffuse into the pores of the rock. When the ratio of the aqueous fluid to viscosifier is changed by such large fluid losses, polysaccharide concentration increases by anywhere from 40 to 2000% forming pastes or rubbery semi-solids that are difficult to remove from the fracture. This limits well productivity and causes problems in maintaining the integrity of the fluid. This is particularly problematic in relatively low permeability formations, in which large surface areas of rock fracture face are exposed to the fluid. In conventional polysaccharide based fluids, usually only water leaks off into the formation.

It has been shown by way of this invention that use of viscoelastic surfactant based fluids dramatically reduces the rate of production of connate water during the well turn-around period, thereby increasing effective fracture length and well productivity.

In high temperature formations, one may provide a hydraulic fracturing fluid wherein the selected thickener is erucyl methyl bis(2-hydroxyethyl) ammonium chloride. It is an object of this invention to provide a fracturing fluid with little or no residue following completion of the fracturing treatment.

Embodiments of the present invention comprise methods employing an aqueous viscoelastic surfactant based fracturing fluid. The fluid comprises water, a salt and a surfactant/thickener capable of forming a worm like micelle. The fracturing fluid may optionally contain a gas such as air, nitrogen or carbon dioxide to provide a foam. Optionally, it may include a cosurfactant to increase viscosity or to minimize the formation of stable emulsions which contain components of crude oil or a polysaccharide or chemically modified polysaccharide, or an organic salt or alcohol, etc.

The surfactants create fluids which have a low leakoff rate. Preferably, these fluids are insensitive to pressure. At high pressures used during a fracturing operation, little fluid is lost to the formation. This reduces the total volume of fluid needed to provide the desired fracture with associated cost savings. Further, since leakoff is minimized, longer fracture length extension is obtained using micellar-type viscoelastic surfactant fluids. At low pressures, these low molecular weight surfactant systems flow out of the formation more easily with better cleanup—showing improved well productivity after fracturing.

Viscoelastic surfactants are relatively small molecules. Each molecule is typically less than 500 grams per mole, which is less than 0.1% the size of the polymers used in some of the prior art. These small molecules will associate under certain conditions to form worm like micelles in an equilibrium state of breaking and reforming. As dynamic structures, the micellar structure are readily altered by shear pressure, the presence of hydrocarbons, or sometimes by increased temperature. All of these features may be found in the hydrocarbon portion of the reservoir. The worm like micelles rapidly assume a structure that is not conducive to creating viscosity and/or the surfactant molecules return to their original small independent state once they are placed into the hydrocarbon bearing zone, and are no longer required to provide viscosity which is required to transport particles into the formation.

To the contrary, the molecules pumped into the aqueous zones of the formation advantageously remain behind in worm like micellar form, and may act to block or impede the flow of water from the formation, as seen in FIG. 6. The micelles of this invention are preferably worm like in shape, as opposed to other geometric shapes such as box shaped or spherical. They are spheroidal in cross-sectional area. Preferably, they are relatively long in comparison to their width, with an average aspect ratio of 100 or greater, in most cases.

Well treatment conditions allow worm like micelles to form under surface conditions, remain stable while they are pumped down the wellbore and through the perforations into a fracture, but then undergo a structural change or disband into individual components on exposure to hydrocarbons in the reservoir rock. Cleanup is often superior to that of the polymer systems, typically higher than 40%.

In addition to the viscoelastic surfactant, the aqueous fracturing fluid in accordance with the invention requires a sufficient quantity of at least one water soluble salt to effect formation stability. Typically, water soluble potassium and ammonium salts, such as potassium chloride, tetramethyl ammonium chloride and ammonium chloride are employed. Additionally, calcium chloride, calcium bromide, magnesium chloride and zinc halide salts may also be used. Other useful salts include aluminum salts, zirconium salts and the like. Formation stability and in particular clay stability is achieved at a concentration level of a few percent by weight, and as such, the density of the fluid usually is not significantly altered by the presence of the salt. However, if fluid density becomes an important consideration, heavier salts may be employed.

Additional uses of the present invention may be found in acid fracturing. In acid fracturing it is desirable to pump sequential stages of viscous fluids and of acids. In theory, the acid fingers into the viscous fluid. These acid fingers etch away the carbonate formation only where the formation is exposed to an acid finger. This creates a fractal type etching pattern on the rock (calcium carbonate) faces. This etched area creates flow channels for the reservoir fluids once the fracturing operation is ceased. For this process to work a mobility ratio of at least 1000 is required between the viscous fluid and the acid fluid. For guar based fluid, this requires a high guar loading and crosslinking (typically with boron or zirconium) to provide the desired mobility ratio. Crosslinked polymer fluids are very similar to those used in hydraulic fracturing and suffer the same limitations as described above. In addition, the guar-based or polymer fluids simply do not work as effectively as desired. Recent laboratory results demonstrate that viscoelastic surfactant derived fluids provide superior finger generation in acid fracturing applications than conventional fluids.

Acids are widely used to stimulate oil production from chalk reservoirs. In fracture acidizing, a fracture, or rather several fractures, are first created by injecting a fracturing liquid under high pressure. After the fractures have been created, acid is injected to etch flow channels that can persist after the fractures have closed thereby increasing the productivity of the well. During some acid treatments, the acids are injected subsequent to a preflush of viscous fluid. This leads to the generation of acid fingers in the more viscous preflush and prevents the formation of near well cavities. Studies have shown that the dissolution rate increases with increasing flow rate and increasing temperature.

Fingered acid-fracturing of vertical wells has been well studied and there are methods for analyzing fingering patterns in linear flow through fractures from vertical wells. The literature indicates that viscous fingering is a function of the mobility ratio between the fluids. Thus fluids which provide similar viscosity should perform in a similar manner. This has not been observed, however. Borate fluids tend to be too sensitive to pH to be used reliably. This is especially true at about 150–200° F. Borate fluids at initial pH of about 9 do not provide adequate fingering downhole. Zirconate fluids can be effective at high guar loadings but are difficult to remove. Under those conditions, surfactant based fluids offer superior performance and well clean-up.

In hydraulic fracturing applications, a sufficient quantity of at least one surfactant/thickener soluble in said aqueous salt solution is employed in the method of this invention to provide sufficient viscosity to suspend proppant during placement, wherein the thickener is at least one member selected from the group consisting of:

(a) an amine corresponding to the formula

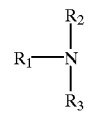

wherein $R_1$ is at least about a $C_{16}$ aliphatic group which may be branched or straight chained and which may be saturated or unsaturated, $R_2$ and $R_3$ are each independently, hydrogen or a $C_1$ to about $C_6$ aliphatic group which can be branched or straight chained, saturated or unsaturated and which may be substituted with a group that renders the $R_2$ and/or $R_3$ group more hydrophilic;

(b) salts of the amine corresponding to the formula

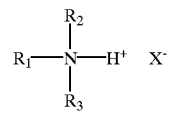

wherein $R_1$, $R_2$ and $R_3$ are the same as defined hereinbefore and $X^-$ is an anion, and;

(c) a quaternary ammonium salt of the amine corresponding to the formula

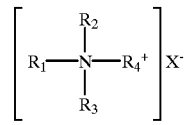

wherein $R_1$, $R_2$, $R_3$ and $X^-$ are the same as defined hereinbefore and $R_4$ independently constitutes a group which has previously been set forth for $R_2$ and $R_3$, none of $R_1$, $R_2$, $R_3$ or $R_4$ are hydrogen, and the $R_2$, $R_3$ and $R_4$ groups of the amine salt and quaternary ammonium salt may be formed into a heterocyclic 5- or 6-member ring structure which includes the nitrogen atom of the amine;

A sufficient quantity of a water soluble organic salt and/or alcohol may optionally be employed to provide desired viscoelastic properties under severe conditions. Preferably the organic salt is a water soluble carboxylate salt such as sodium or potassium salicylate or the like. However, this salt is not required in all cases. Preferably the alcohol is a cosurfactant, typically a $C_4$ to $C_{12}$ aliphatic alcohol.

The thickening agent employed in the invention comprises at least one of the thickening agents set forth herein. It has been found that with certain solutions, a mixture of two or more thickeners may be preferred.

In instances where the thickening agent is an amine acid salt or a quaternary ammonium salt, the associated anion should be an inorganic or an organic anion. Preferably, $X^-$ is an inorganic anion such as a sulfate, nitrate, perchlorate or halide. A halide (Cl, Br or I) is preferred, Cl and Br being most preferred.

The optional organic salt constituent of the fracturing fluid, when employed, is preferably a water soluble compound involving typically a sodium or potassium salt of an organic anion. The anion may be an aromatic organic anion such as a salicylate, naphthalene sulfonate, p- and m-chlorobenzoates, 3,5 and 3,4 and 2,4-dichlorobenzoates, t-butyl and ethyl phenate, 2,6 and 2,5-dichlorophenates, 2,4,5-trichlorophenate, 2,3,5,6,-tetrachlorophenate, p-methyl phenate, m-chlorophenate, 3,5,6-trichloropicolinate, 4-amino-3,5,6-trichloropicolinate, 2,4,-dichlorophenoxyacetate, toluene sulfonate, a,b-napthols, p.p'bisphenol A or cocoamidopropyl dimethyl amine oxide. The thickening agent should be chosen such that the anion is compatible with the electrolyte present in the aqueous solution such that undesirable precipitates are not formed. Also the specific anion chosen will depend to some degree on the specific amine structure.

The thickening agent is employed in an amount which in combination with the other ingredients is sufficient to increase the viscosity of the aqueous fluid enough to maintain proppant in suspension during fluid placement. The exact quantity and specific thickener or mixture of thickeners to be employed will vary depending on the concentration of and selection of specific soluble salt(s) employed to make up the solution, the viscosity desired, the temperature of use, the pH of the solution, and other similar factors.

The concentration of the surfactant thickener can range from about 0.05 to about 6 percent by weight of the fluid. Laboratory procedures are employed to determine the optimum concentrations for any particular set of parameters. For example, when a non-protonated amine is employed as the thickener, the pH of the aqueous fluid can change to some degree the effectiveness of particular amines. More acidic solutions are required for some amines to be completely dissolved. It is possible that this fact results because the amine must become protonated before it will become effectively dissolved in the fluid.

Thickeners are selected from a group of surfactant materials capable of forming the preferable worm like micelles as opposed to typical surfactant materials which tend to form spherical micelles or sheet-like structures. Further, in order to be useful in the present invention, the selected surfactant must be able to form the worm like micelles over a broad range of concentrations, such as 1 to 8 percent by weight in the aqueous fluid. The number of surfactant materials that can be successfully used in the invention decreases with increasing temperature.

The preferred thickener is erucyl bis(2-hydroxyethyl) methyl ammonium chloride. Alternative thickeners may be employed either alone or in combination in accordance with the invention, including erucyl trimethyl ammonium chloride; N-methyl-N,N-bis(2-hydroxyethyl) rapeseed ammonium chloride; oleyl methyl bis(hydroxyethyl) ammonium chloride; octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis (hydroxyethyl) ammonium 3,4,-dichlorobenzoate; cetyl tris (hydroxyethyl) ammonium iodide; bis(hydroxyethyl) soya amine; N-methyl, N-hydroxyethyl tallow amine; bis (hydroxyethyl) octadecyl amine; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; N,N-dihydroxypropyl hexadecyl amine, N-methyl, N-hydroxyethyl hexadecyl amine; N,N-dihydroxyethyl dihydroxypropyl oleyl amine; N,N-dihydroxypropyl soya amine; N,N-dihydroxypropyl tallow amine; N-butyl hexadecyl amine; N-hydroxyethyl octadecyl amine; N-hydroxyethyl cosyl amine; cetylamino, N-octadecyl pyridinium chloride; N-soya-N-ethyl morpholinium ethosulfate; methyl-1-oleyl amido ethyl-2-oleyl imidazolinium-methyl sulfate; and methyl-1-tallow amido ethyl-2-tallow imidazolinium-methyl sulfate.

To prepare the aqueous hydraulic fracturing fluid in accordance with the present invention, the thickener is added to an aqueous solution in which has been dissolved a quantity of at least one water soluble salt. Standard mixing procedures known in the art can be employed since heating of the solution and special agitation conditions are normally not necessary. Of course, if used under conditions of extreme cold such as found in Alaska or Canada, normal heating procedures should be employed.

Sometimes it is preferable to dissolve the thickener into a lower molecular weight alcohol prior to mixing it with the aqueous solution. The lower molecular weight alcohol or diol, for instance isopropanol or propylene glycol, may function to aid to solubilize the thickener. Other similar agents may also be employed. Further, a defoaming agent such as a polyglycol may be employed to prevent undesirable foaming during the preparation of the fracturing fluid if a foam is not desirable under the conditions of the treatment. If a foamed fluid is desired, a gas such as air, nitrogen, carbon dioxide or the like may be employed.

In addition to the water soluble salts and thickening agents described herein, the aqueous hydraulic fracturing fluid may contain other conventional constituents which perform specific desired functions, e.g., corrosion inhibitors, fluid-loss additives, and others as described previously herein, and the like. The proppant can then be suspended in the fracturing fluid.

EXAMPLE 1

Three 500-mL beakers were filled with 250 mL of three percent (by weight) ammonium chloride solution. Erucyl bis (2-hydroxyethyl) methyl ammonium chloride was added at three concentrations: 2%, 3% and 4% by volume. No sodium salicylate was added. The systems were stirred until all of the surfactant dissolved. Rheological measurements were performed at 110°, 130°, 1500° and 175° F.

FIG. 19 shows the viscosity of surfactant-base fracturing fluids prepared without the addition of sodium salicylate. The data show that sufficient viscosity for adequate proppant transport (50 cp @ 170 sec$^{-1}$) can be attained at fluid temperatures up to about 175° F.

EXAMPLE 2

Two 500-mL beakers were filled with 250 mL of three percent (by weight) ammonium chloride solution. Erucyl bis (2-hydroxyethyl) methyl ammonium chloride was added at 4% by volume. Sodium salicylate (0.06 wt %) was added to one beaker and 0.5 wt % erucyl amine was added to the other. The systems were stirred until all of the surfactant dissolved. Rheological measurements were performed at 175° and 200° F. The results show that erucyl amine has utility as a high temperature viscosity stabilizer.

| | Viscosity @ 170 sec$^{-1}$ (cp) | |
|---|---|---|
| Additive | 175° F. | 200° F. |
| sodium salicylate (0.06 wt%) | 108 | 21 |
| erucyl amine (0.5 wt%) | 136 | 81 |

EXAMPLE 3

Two 500-mL beakers were filled with 250 mL of three percent (by weight) ammonium chloride solution. Erucyl bis (2-hydroxyethyl) methyl ammonium chloride was added at 4% by volume. Cocoamidopropyl dimethyl amine oxide (0.6 wt %) was added to one beaker. The systems were stirred until all of the surfactant dissolved. Rheological measurements were performed at 130°, 150° 175° F.

The results show that cocoamidopropyl dimethyl amine oxide (0.6 wt %)has utility as a viscosity enhancer in this temperature range.

|  | Viscosity @ 170 sec$^{-1}$ (cp) | | |
|---|---|---|---|
| Additive | 130° F. | 150° F. | 175° F. |
| none | 213 | 198 | 174 |
| cocoamidopropyl dimethyl amine oxide (0.6 wt%) | 306 | 210 | 195 |

EXAMPLE 4

Example 4 demonstrates properties which may be obtained using different viscosifying agents (benzoic acid derivatives).

To a 3% ammonium chloride solution in a Warring blender, the following were dissolved: 0.5 mM benzoic acid derivatives like, sodium salicylate, 3-hydroxy benzoic acid, 4- and 5-methyl salicylic acid. The solution was mixed well and deareated before measuring the viscosity on a reciprocating capillary viscometer. The viscosity was measured at various temperature from 80 F. to 225 F.). The viscosity values at 200 degrees F are provided below:

| Substituted benzoic acid (Na salt) | % erucyl bis (2-hydroxyethyl) methyl ammonium chloride | Viscosity @ 100 s$^{-1}$ (200 ° F.) |
|---|---|---|
| 2-hydroxy benzoic acid | 4 | 88 |
| 4-hydroxy benzoic acid | 4 | 44 |
| Amino-2-hydroxy benzoic acid | 4 | 68 |
| 3,5-Dinitro-2-hydroxy benzoic acid | 4 | 73 |
| 5-Methyl-2-hydroxy benzoic acid | 4 | 100 |
| 5-Methyl-2-hydroxy benzoic acid | 5 | 120 |
| 4-Methyl-2-hydroxy benzoic acid | 4 | 91 |
| 3,5-Di-isopropyl-2-hydroxy benzoic acid | 4 | 75 |

4-and 5-substituted 2-hydroxy benzoic acid gave sufficient viscosity (57 sec$^{-1}$) even at 220 F. at a Erucyl bis (2-hydroxyethyl) methyl ammonium chloride concentration of 4%.

EXAMPLE 5

Experiments in the Presence of Polysaccharide (guar)

In a similar experiment, to 3% ammonium chloride solution, dissolve 0.5 mM sodium salicylate. To this hydrated guar is added to get a final concentration of 2 to 5 lb/1000 Gal followed by 0.5 to 5% surfactant solution. The solution is mixed well and viscosity is measured on a reciprocating capillary viscometer. The viscosity of 5% Erucyl bis (2-hydroxyethyl) methyl ammonium chloride in the presence of 5 lb Guar is given below:

|  | n' | k' | Temp (° F.) | Viscosity @ 100 s$^{-1}$ |
|---|---|---|---|---|
| 1 | 0.3942 | 0.2075 | 90 | 610 |
| 2 | 0.2230 | 0.1960 | 150 | 262 |
| 3 | 0.3221 | 0.0957 | 175 | 202 |
| 4 | .4772 | 0.0091 | 200 | 40 |

EXAMPLE 6

Example 6 provides for the addition of fluoro compounds and cosurfactants to prevent emulsions. The presence of fluoro compounds and other non-ionic surfactants as co-surfactants with Erucyl bis (2-hydroxyethyl) methyl ammonium chloride are examined. They are found to be useful as deemulsifiers in Erucyl bis (2-hydroxyethyl) methyl ammonium chloride-diesel systems. Addition of 0.001% to 0.1% Fluorad-FC 750 and Fluorad FC 754; and non-ionic and cationic surfactant blends were found to decrease the formation of emulsion The de-emulsification was tested by two methods. To 10 ml of Erucyl bis (2-hydroxyethyl) methyl ammonium chloride gel, 1 μl to 200 μl of the de-emulsifier was added and swirled well. To this 20 ml of diesel is added and shaken well for 30 seconds. The efficiency of different surfactants were compared from the time required to separate it into two layers. It is also tested by looking at the pressure required to filter the mixture through a Whitmann membrane. The presence of flour-compounds and other surfactants made the filtration easier.

The viscosity of erucyl bis (2-hydroxyethyl) methyl ammonium chloride in the presence of these compounds were also tested and it is shown that these compounds enhance viscosity of Erucyl bis (2-hydroxyethyl) methyl ammonium chloride.

EXAMPLE 7

A series of experiments was conducted to determine the half lives of viscoelastic surfactant-base foams generated at elevated temperature and pressure. The results show adequate foam stability up to 190° F.

The apparatus uses a heated 250-mL ISCO syringe pump to feed the liquid phase into a foam generator. A nitrogen bottle with a Brooks digital flow controller feeds the gas into the foam generator. The foam passes by a sight glass that allows one to observe the foam texture and bubble size distribution, then goes on to fill a collection vessel with a glass wall. The cell is heated by a water circulating from a Hakke bath. An outlet is fitted on the collection vessel that allows foam sampling.

One liter of a base fluid composed of 4 vol % erucyl bis (2-hydroxyethyl) methyl ammonium chloride +0.06 wt % sodium salicylate was prepared in the manner described in previous examples. The foams were generated at about 1100 psi, then pumped into the preheated collection vessel. The half lives of foams (the time at which 50% of the base fluid has separated from the foam) were measured at four test temperatures: 150°, 175°, 185° and 190° F. The results are shown in the following table.

| Temperature (° F.) | Half Life (hr) |
|---|---|
| 150 | >6 |
| 175 | 3 |
| 185 | 2.5 |
| 190 | 0.6 |

The results show adequate foam stability up to 190° F.

EXAMPLE 8

The fluid leakoff control characteristics of surfactant based fluids to polymer based fluids was evaluated in dynamic fluid loss tests. This test procedure simulates the leakoff of fracturing fluids into a porous media under representative hydraulic fracturing conditions. The tests were conducted with a generic Borate-crosslinked guar fracturing fluid and a generic surfactant base fluid, the additives and their concentration as specified in Table 1. The tests involve maintaining a 1000 psi differential pressure across the length of the core, for a period sufficiently long enough so that a steady leakoff rate is established. Steady leakoff conditions are established either when an impermeable external filter cake forms on the face of the core, or when the internal pores are filled with an internal filter cake. Steady leakoff rate can also exist when the leakoff control mechanism is viscosity controlled.

TABLE 1

Composition of test fluids

| A | | B | |
|---|---|---|---|
| Name | Concentration | Name | Concentration |
| Guar | 20 lb/1000 gal | Ammonium Chloride | 250 lb/1000 gal |
| KCl | 167 lb/1000 gal | Sodium Salicylate | 5 lb/1000 gal |
| Antifoam | 0.5 gal/1000 gal | ** | 40 gal/1000 gal |
| Bactericide | 0.25 gal/1000 gal | | |
| Xlinker | 1.5 lb/1000 gal | | |
| Xlinker activator | 7 gal/1000 gal | | |
| Surfactant | 1 gal/1000 gal | | |
| Diesel No. 2 | 20 lb/1000 gal | | |

**Composition comprised of 75% erucyl methyl bis(2-hydroxyethyl) ammonium chloride and 25% isopropyl alcohol.

The retained permeability of the cores after leakoff was estimated from the pressure drop required to flow brine at a constant flow rate through the core. The direction of the flow is reversed in comparison to the direction of leakoff, so that the flow back retained permeability is representative of the permeability to the flow of formation fluid.

EXAMPLE 8 Results

Table 2 shows results obtained as in 8 further in that it shows the results of the dynamic fluid loss tests for the guar based fluid and our surfactant based fluid along with the matrix retained permeability after 25 min. during flow back. These data demonstrate that the surfactant fluid has better leakoff control characteristics. The data further demonstrate that, in comparison to polymer based fluids, the reduction in retained perm with the surfactant based fluid for brine (formation water) is not only lower but also more sustainable. This demonstrates that in comparison to polysaccharide based fluids, the surfactant fluid would delay the entry of formation water into the fracture, thus enhancing the fracture cleanup potential.

TABLE 2

Comparison of the leakoff characteristics of a Polymer based fluid and a Viscoelastic Surfactant fluid

| | | Leakoff (ml) | | Retained Perm |
|---|---|---|---|---|
| Example | Fluid | 1 min | 50 min | after 25 min |
| A | 20 lb/1000 gal Borate XL Guar | 1.2 | 12.9 | 40.0% |
| B | 4% mixture:*** | 1.3 | 5.8 | 8.2% |

***Composition comprised of 75% erucyl methyl bis(2-hydroxyethyl) ammonium chloride, and 25% isopropyl alcohol

EXAMPLE 9

Figure 8:
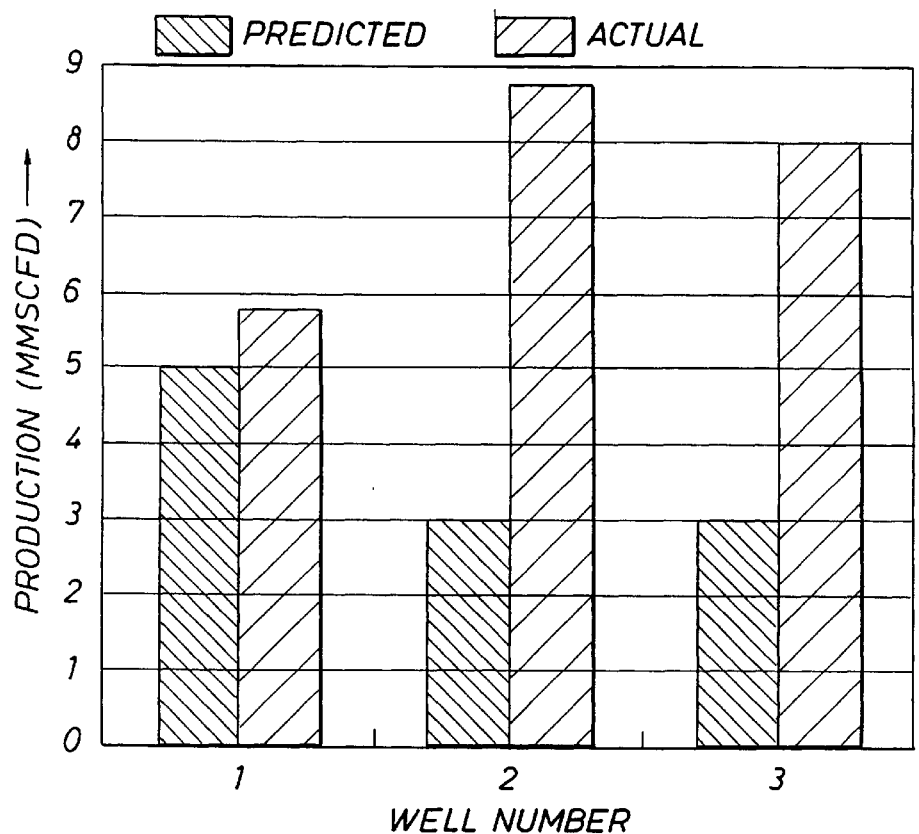
FIGS. 8 and 9 shows results of tests described in Examples 9 and 10 respectively, and are discussed in connection with those Examples.

The case history as seen in FIG. 8 shows the results from three treatments that were performed on gas wells. The formation permeability was approximately 25 mD. The well operator had indicated, based on previous experience in the area, what the expected production rates were for these wells. For each well, when the formation was fractured with the surfactant-base fracturing fluid of this invention. The resulting production rate was significantly higher than expected.

EXAMPLE 10

Figure 9:
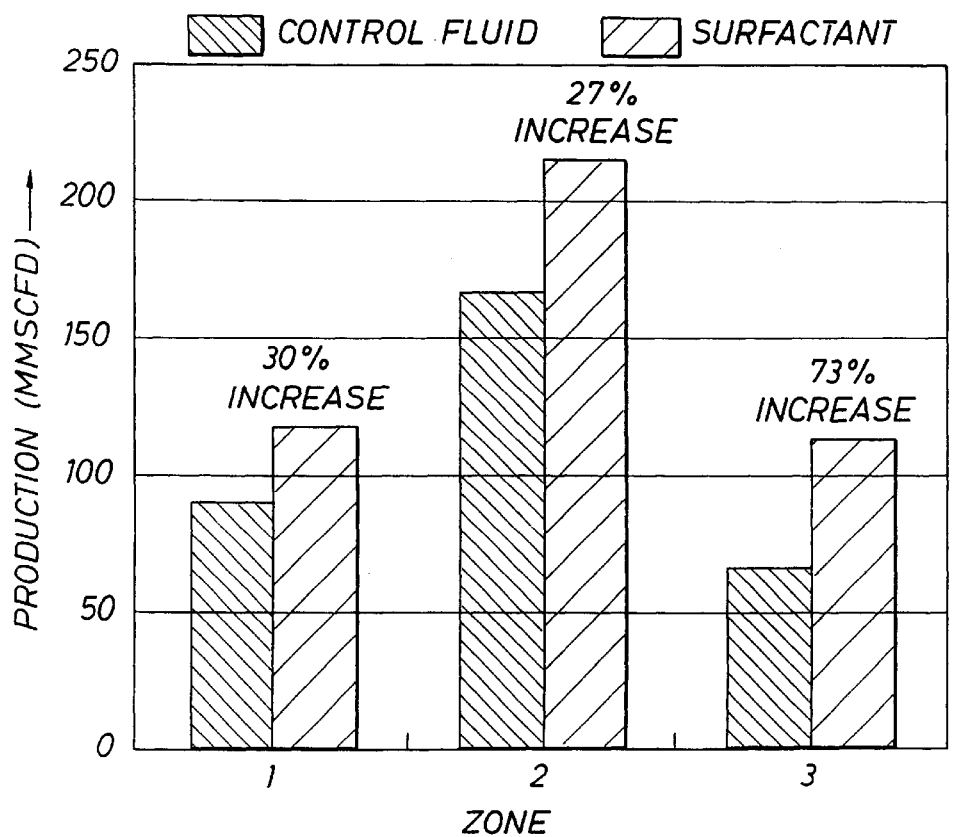

The case history of FIG. 9 shows the results of treatment of three zones in a gas well with a viscoelastic surfactant-base fracturing fluid. The production rates from each zone are compared with those from an offset well that had been fractured with a polysaccharide-based fluid (guar). An production-rate improvement ranging from 27% to 73% was observed when the surfactant-base fracturing fluid was used.

EXAMPLE 11

Blending tests were performed with the Witco surfactant containing erucyl methyl bis(2-hydroxyethyl) ammonium chloride, available from the Witco Chemical Company (hereafter in this example set forth as "SURFACTANT").

The tests showed the invention of this application may be successfully utilized by pumping the surfactant directly to the blender, without prolonged hydration in a mixer as required in the prior art fracturing methods. Thus, it will be possible to achieve viscosity increases and almost simultaneously pump the fracturing fluid into the wellbore, avoiding the use of an extra mixing or hydration step, thereby saving substantial time and resources, and facilitating real time adjustment of viscosity levels.

For example, SURFACTANT has no problem yielding its viscosity in either continuous or batch mix techniques using existing equipment and methods set up on the frac boats. Metering was accomplished using a combination of 75% of erucyl compound and 25% of isopropyl alcohol.

The same continuous mix equipment set up used for PermFRAC™ treatments were arranged and performed with the ClearFRAC™ material mix test. The SURFACTANT was placed in a returnable tote on the second floor mixing deck of an offshore fracturing boat, next to the skid. The tote was rolled just prior to use by using; the product being taken off bottom and pumped back on top. The 3% $NH_4Cl$ was cut into 230 bbls of city fresh water located in the starboard 3 below deck boat tank. Water temp was 88 degrees F. No high temp stabilizer was put in the mix water, simulating worst continuous mix conditions.

Two skid pumps (0 to 40 bpm) were primed and plumbed into the suction manifold of the starboard blender. The starboard in-line was the pump used. Prior to pumping 3% NH$_4$Cl the blender and pump were first lined out using river water. The pump rate was set at 15 bpm (barrels per minute). The surfactant was set at 25 gpm (gallons per minute) using one of the pumps (4% surfactant loading). Once the test was started samples were taken at the discharge manifold of the blender, at the suction of the triplex pump, and down stream of the triplex pump. A total of 8 samples were taken, 4 at the blender, and 2 each from the suction and downstream sides of the triplex. A total of 60 bbls of clean fluid was mixed followed by 50 bbls of slurried fluid ramped from 1 to 15 ppa using 12/20 proppant.

Continuous Blend Test Results

Table 4 lists the Fann 35 measurements taken on the collected samples. The data shows the SURFACTANT was fully yielded coming out of the blender, indicating enough shear is imparted to the surfactant in the blender slinger to fully yield the product—no additional time or shear is required. No sand accumulation problem was seen when the hoses and equipment were inspected after the mix test. The only problem encountered was the one inch hose feeding the surfactant to the blender was taxed to deliver the SURFACTANT material at 25 gpm, even though an A pump was used. A two inch line is recommended. Also, the 550 gallon tote appears to be a good working tank to pull from for continuous mix. The 550 gal tote placed on a 110 gal tote (i.e. placed ~3 feet high for additional hydrostatics) is therefore recommended as preferred.

Batch Mix Test Conditions

A total of 25 bbls of 4% SURFACTANT was batch mixed in 3% NH4Cl using one of the deck 50 bbl paddle tank blenders. No centrifugal pump was used. The paddle was set at medium speed (~30–40 rpm). Water temp was 88 F. The SURFACTANT was fed into the fluid from the top at a rate of ~6 gpm.

Batch Mix Test Results

During the blending test it was noticed that the SURFACTANT started to yield viscosity before all of the material was added (within 3 minutes of initial addition). It took a total of ~7 minutes to add the SURFACTANT material. The last portion of SURFACTANT had no problem shearing into the viscosified fluid. Fann 35 measurements showed the SURFACTANT was fully yielded within 10 minutes after the last portion of SURFACTANT was added. The test showed that even at medium paddle speed plenty of shear is available to shear in and readily yield the SURFACTANT product.

Conclusion As To Example 11 Test Data

The continuous mix test showed the SURFACTANT ClearFRAC™ material was fully yielded coming out of the discharge of the blender, showing the blender delivers an ample amount of shear to yield the product. For this mix test the ambient temperature of the SURFACTANT and mix water were in the upper 80's. The effects of lower temperature mix water and surfactant on how well the blender will yield the SURFACTANT product is not known at this time.

The batch mix test performed showed that the SURFACTANT material can be easily batch mixed. A moderate amount of shear will readily yield the SURFACTANT material. To mix below deck the smaller 230 and 250 bbl tanks are recommended over the larger 500 and 550 bbl tanks, with the tanks no more than 95% full to enhance fluid circulation.

TABLE 3

Clear FRAC Mix Test On BO30 Using 4% Witco Surfactant in 3% NH$_4$Cl

| Fluid | Temp. (° F.) | Viscosity (cp) @ 170s$^{-1}$ |
|---|---|---|
| Lab Sample | 85 | 156 |
|  | 150 | 135 |
| Batch Mix Sample | 88 | 162 |
|  | 150 | 141 |
| POD 1 minute | 87 | 150 |
|  | 150 | 132 |
| POD 2 minutes | 87 | 165 |
|  | 150 | 138 |
| POD 3 minutes | 87 | 174 |
|  | 150 | 144 |
| POD 4 minutes | 87 | 180 |
|  | 150 | 147 |
| Triplex Solution 2 minutes | 87 | 159 |
|  | 150 | 135 |
| Triplex Solution 4 minutes | 87 | 180 |
|  | 150 | 147 |
| Downstream of Triplex 2 minutes | 87 | 156 |
|  | 150 | 135 |
| Downstream of Triplex 4 minutes | 87 | 174 |
|  | 150 | 140 |

EXAMPLE 12

Figure 10:
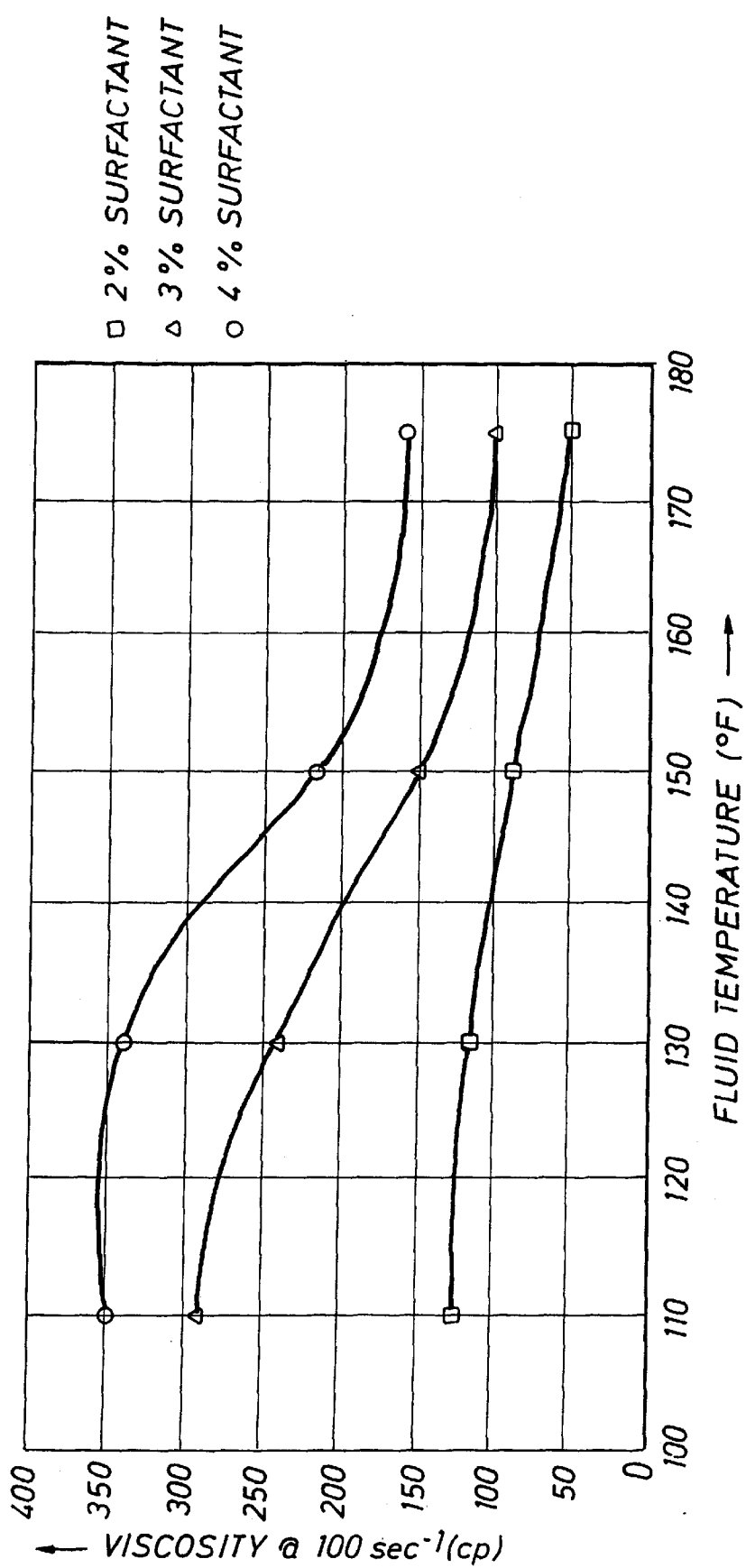
FIG. 10 shows the effect of different salt concentrations on the stability of a gel containing 2% VES for different temperatures. The low (4%) $NH_4Cl$ concentration data are shown by circles; the high (6%) $NH_4Cl$ concentration data are shown by triangles.

The effect of different salt concentrations on the stability of a gel containing 2% surfactant at different temperatures, is shown in FIG. 10. Some of the data discussed in this Example, and subsequent Examples, as well as the supporting figures, are also discussed in M. Samuel, et al., *Polymer-Free Fluid for Hydraulic Fracturing*, SPE 38622 (1997), which is hereby incorporated by reference in its entirety. Specifically, FIG. 10 shows VES fluid stability for 2% VES system containing 4% NH$_4$Cl (circles) or 6% NH$_4$Cl (triangles)

EXAMPLE 13

Figure 15:
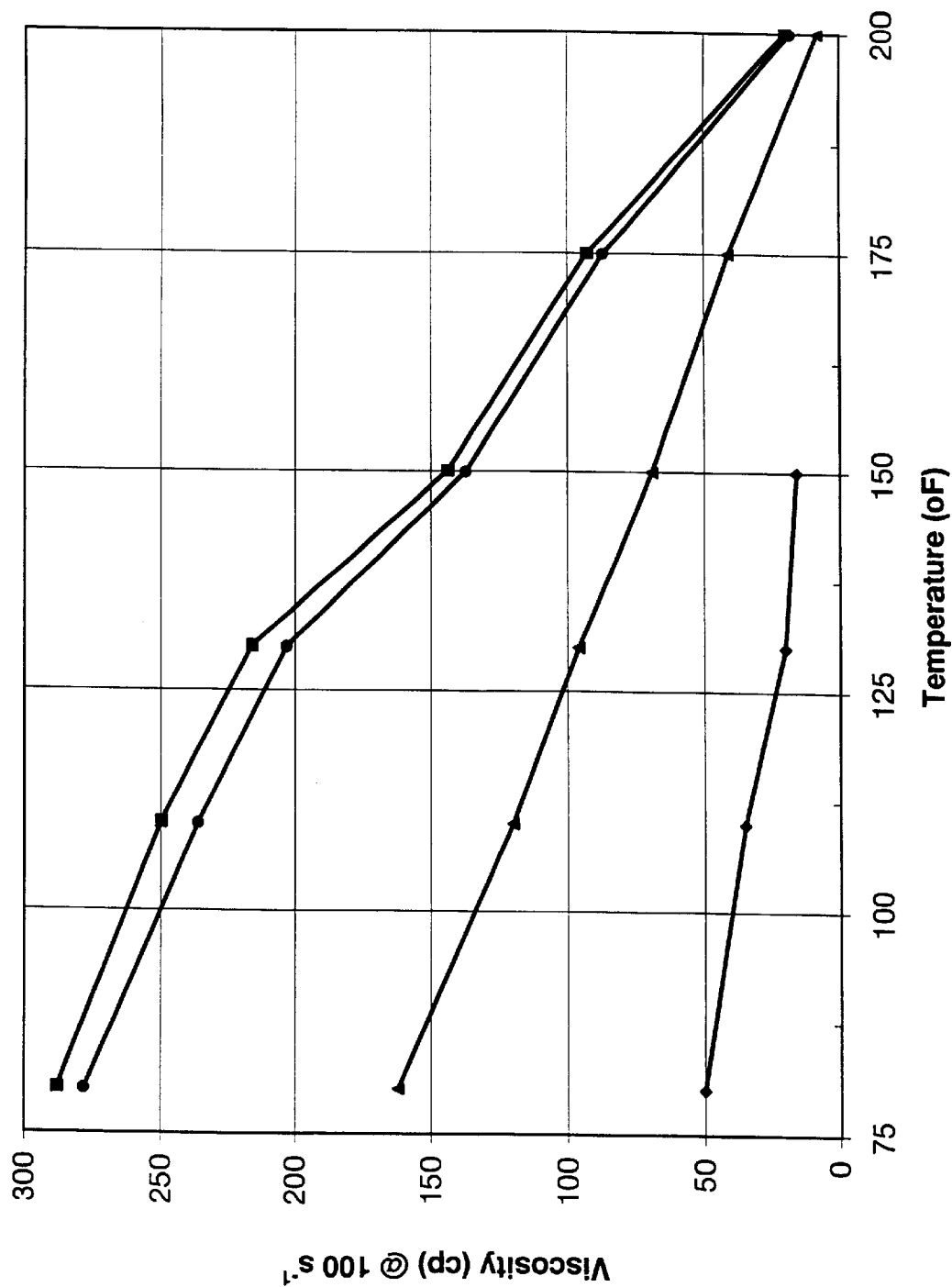
FIG. 15 shows the stability of various VES fluids when prepared using seawater; 1% (diamonds), 2% (triangles); 3% (circles), 4% (squares).
Figure 17:
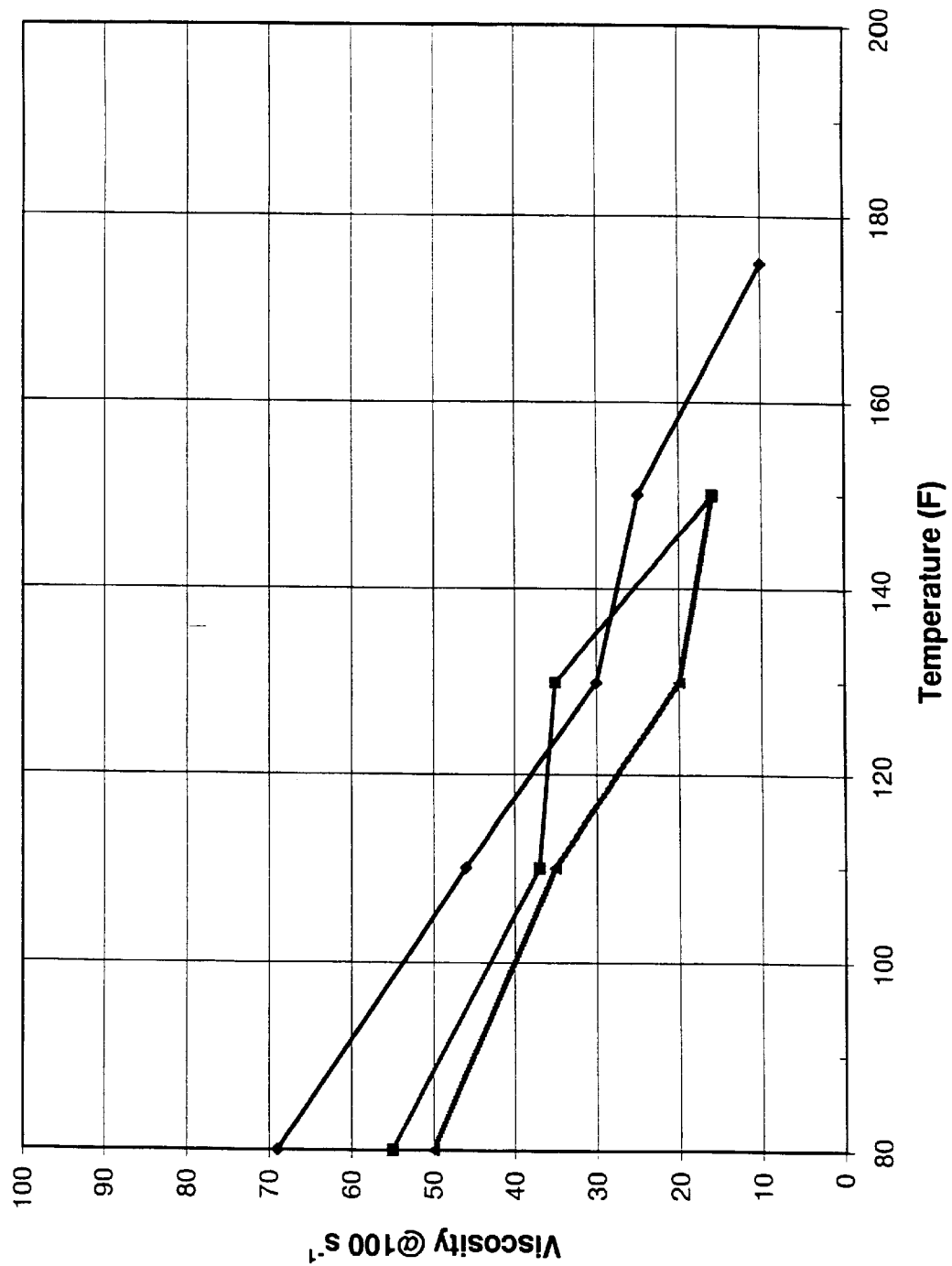
FIG. 17 shows the stability of a VES-based fluids (1%) in the presence of various ions (KCl=diamonds, $NH_4Cl$= squares) in freshwater, compared with a VES Fluid prepared using seawater (triangles).

FIG. 15 illustrates that the VES-based fluids of the present Invention are sufficiently stable when prepared entirely from filtered seawater. The system described in FIG. 15 contains no other ions, beyond those provided in the seawater. As evidenced by FIGS. 17 and 18, the VES-based fluids of the present Invention also exhibit excellent stability when compared with systems prepared from freshwater (and 4% NH$_4$Cl). These data demonstrate that the VES-based fluids can be prepared using either freshwater or seawater, or a combination of both, sufficient to achieve the objectives of the present Invention.

EXAMPLE 14

Figure 11:
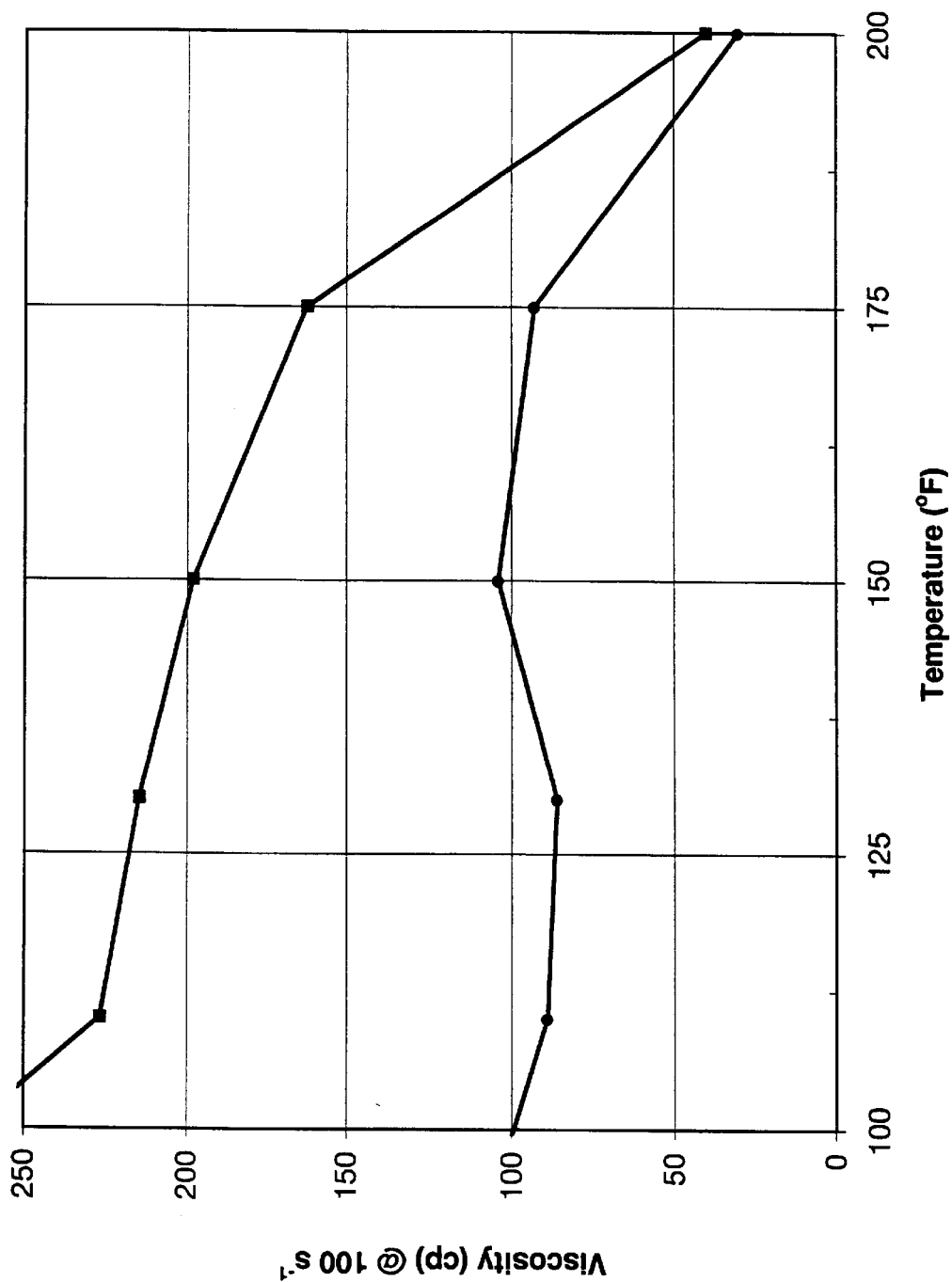
FIG. 11 shows the effect of replacing part of the inorganic anion with an organic anion; on the stability of two gels containing 3% (circles) and 4% (squares) VES, respectively.

Additional studies were performed to investigate the effect of organic (in contrast to inorganic) counterions on VES fluid stability. FIG. 11 shows a stability profile as a function of temperature for a 3% (circles) and a 4% (squares) VES system prepared form freshwater, 4% NH$_4$Cl, and 0.05% salicylate. As evidenced by FIG. 11 (when compared with FIG. 10), organic counterions significantly influence the viscosity of VES-based systems of the present Invention. Indeed, even small amounts of organic anions increases the viscosity of the fluid at moderately high temperatures (>175° F.). As with inorganic salts, increasing the concentration of the organic salt increases the maximum use temperature of the fluid. Thus the maximum use temperature for the system containing the organic salt is about 40° F. higher than that for the inorganic system.

Figure 12:
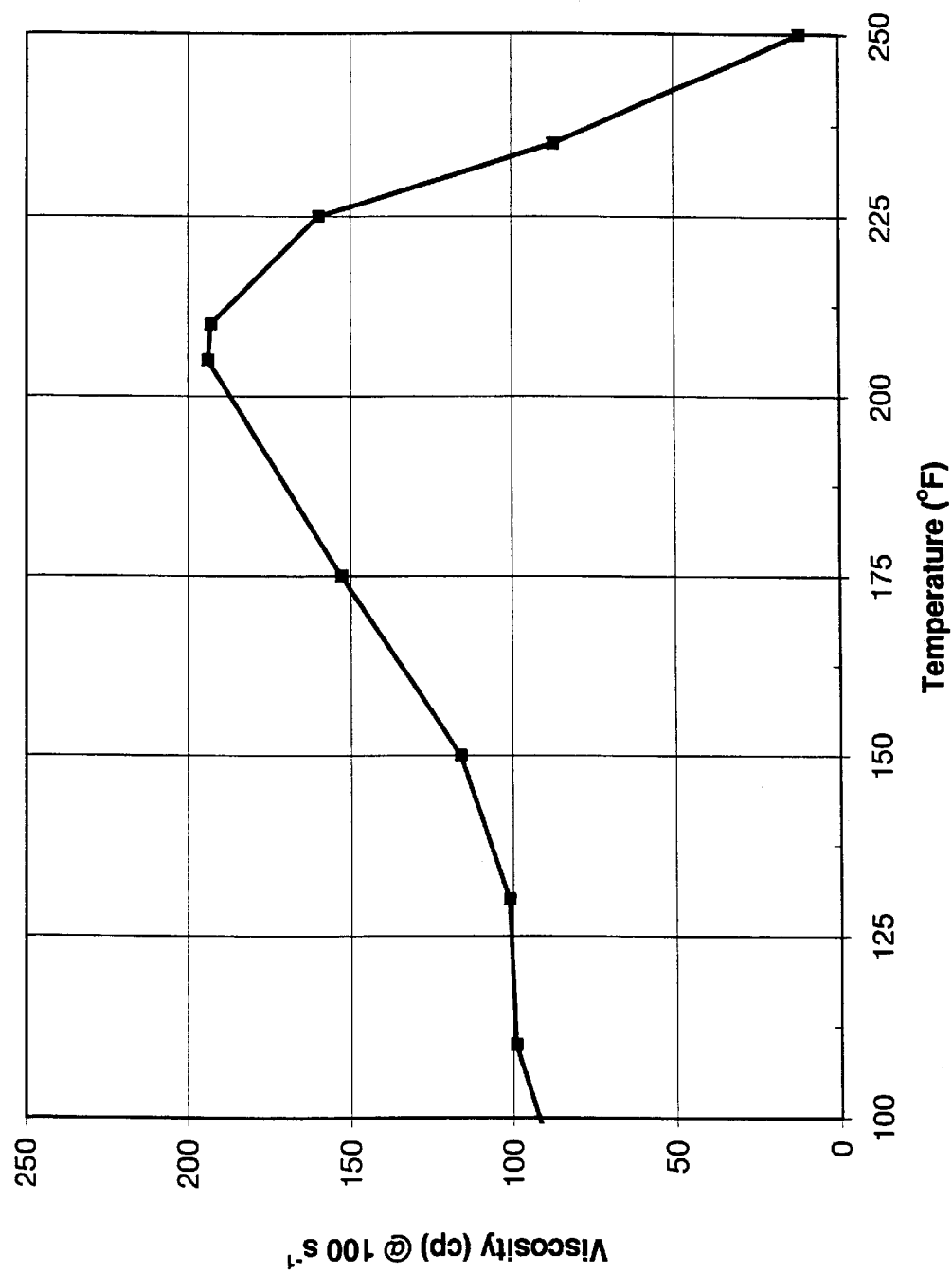
FIG. 12 shows the rheology of a 4% VES fluid in the presence of a high concentration of organic counterion.
Figure 13:
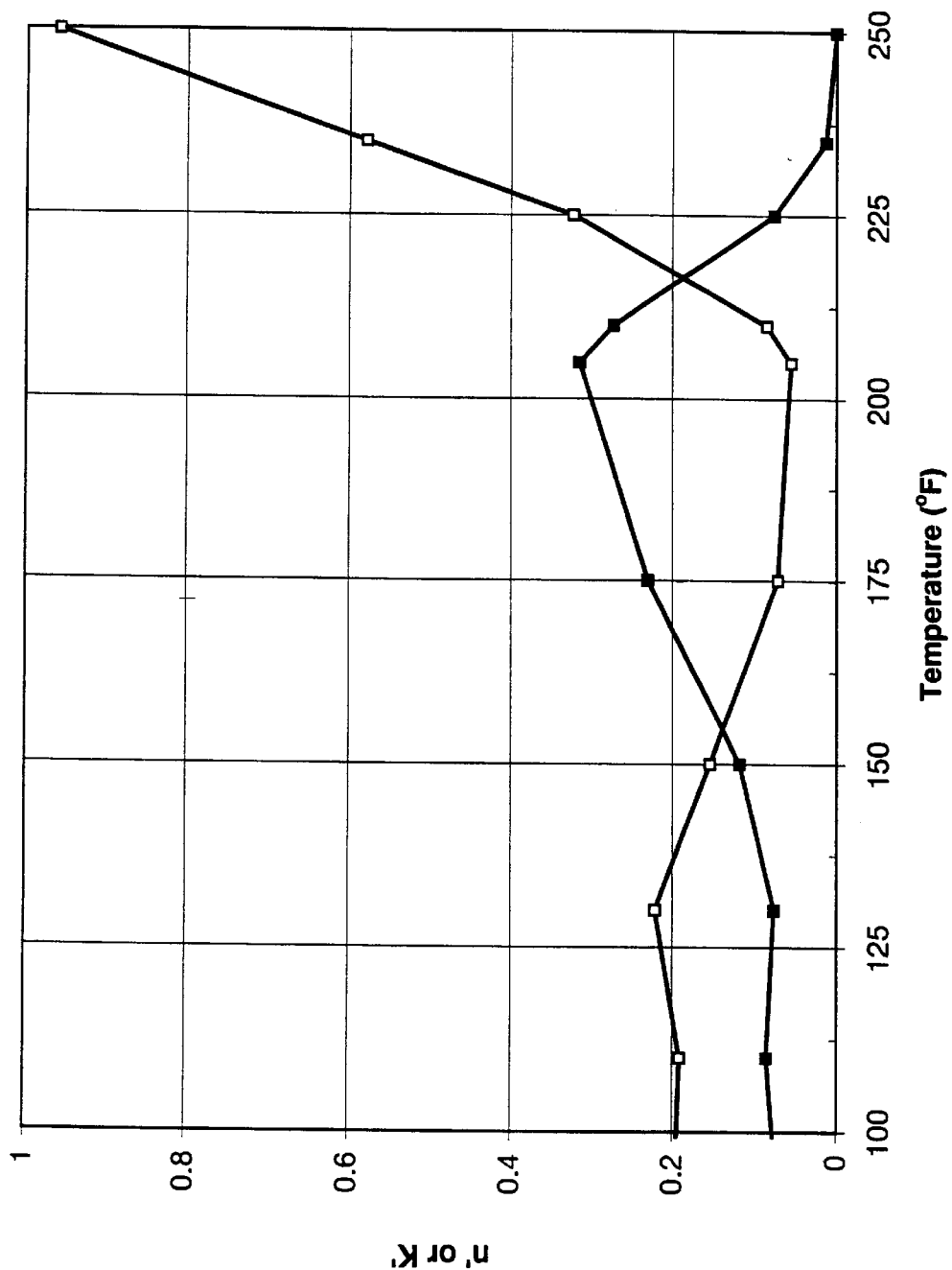
FIG. 13 shows the Power law index (n', open square) and consistency index (K', filled square) of VES fluid in the presence of a high concentration of organic counterion.
Figure 16:
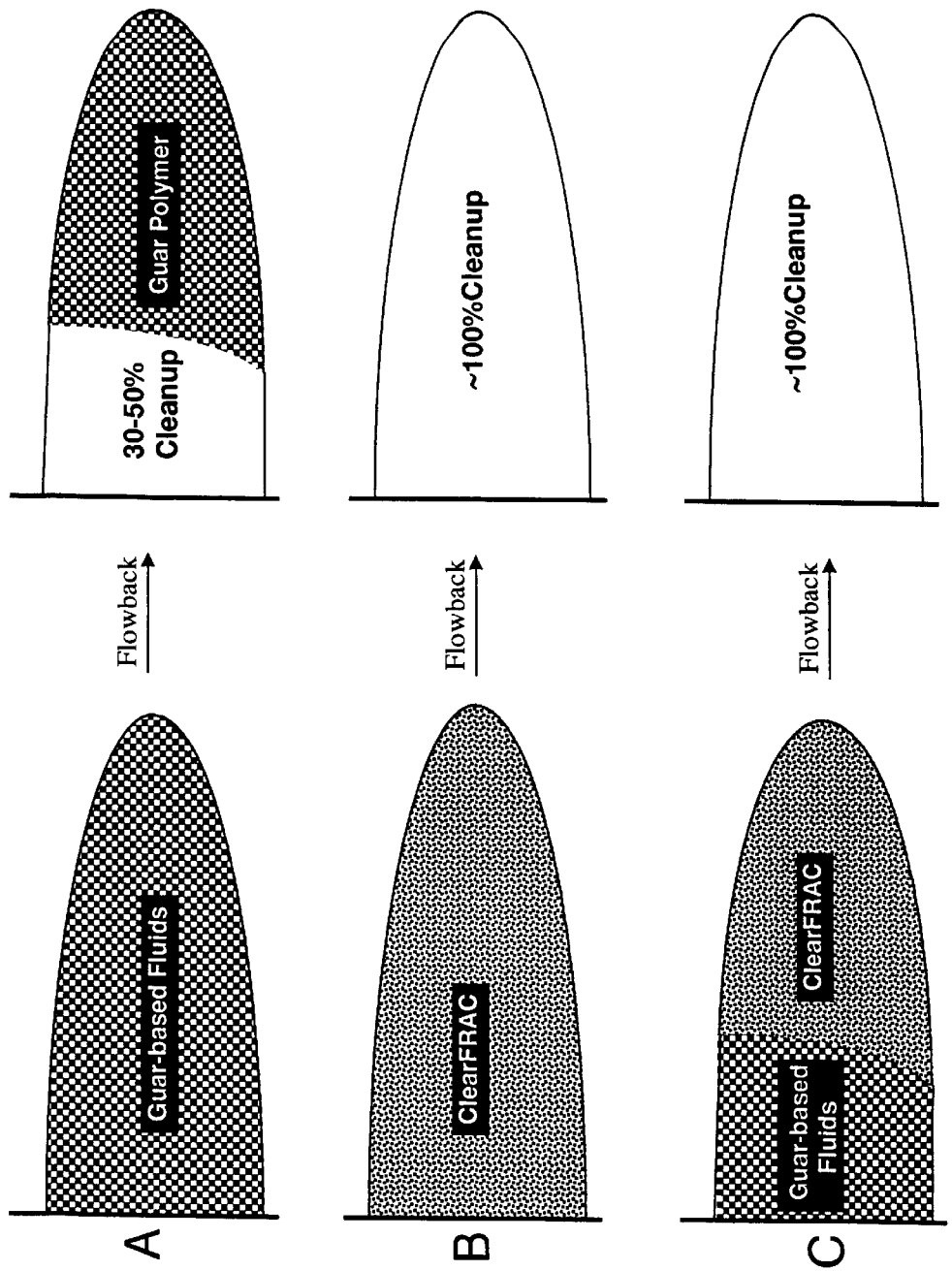
FIGS. 16 is a stylized cross-sectional depiction of a fracture zone.

A different system is presented in FIG. 12. To this system, no inorganic ion was added; the only counterion added was organic, 0.6% salicylate. Therefore, the VES systems of the present Invention are stable in the presence of organic ion alone, without the need for any inorganic ion. Moreover, as evidenced by FIG. 12, the advantage of using high concentrations of organic counterions is two-fold. One, it increases the fluid rheology at high temperature, as well as raise the maximum applicable temperature from 200 to 240° F. Additionally FIG. 13 (the identical system as in FIG. 12) shows the power law index (n') and the consistency index (K') of the VES fluid (from FIG. 12) having organic anion concentrations. Without wishing to be bound by this explanation, we theorize that the robust effect on fluid stability upon organic anion addition may be due to coordination complexes formed between the salicylate (a bi-dendate chelating agent) and the cation (i.e., Lewis acids) on the outboard VES heads. A second mechanism may also contribute to VES fluid stability in the presence of organic moieties (whether charged or not), particularly large non-polar organic compounds. Unlike the first mechanism, this is not a surface effect. Large enough organic molecules—whether having a net electrostatic charge or not—may actually penetrate the micellular structure, and once inside, may increase the micelle's volume. Larger micelles of course confer greater viscosity to the fluid. Hence, the VES-based fluid of the present Invention, if used in conjunction with a guar (or modified guar) system (e.g., in a two-stage treatment as in FIG. 16) which was gelled using, for instance, diesel oil, would be expected to have enhanced stability—that is, the diesel oil (in addition to the guar) would actually improve the viscosity of the VES portion of the fluid.

Therefore, based on the data presented in this Example, one should expect a well-treatment (e.g., fracturing fluid) comprised of, for instance, guar or modified guar and a VES system of the present Invention, to possess superior stability. Thus, for instance a two-stage fracturing treatment (FIG. 16) comprised of injection of VES fluid followed by injection of a guar system-to optimize treatment costs and spent-fluid recovery—would be expected to have excellent stability. Similarly, a blended (polymer plus VES) treatment can also be applied.

EXAMPLE 15

Figure 14:
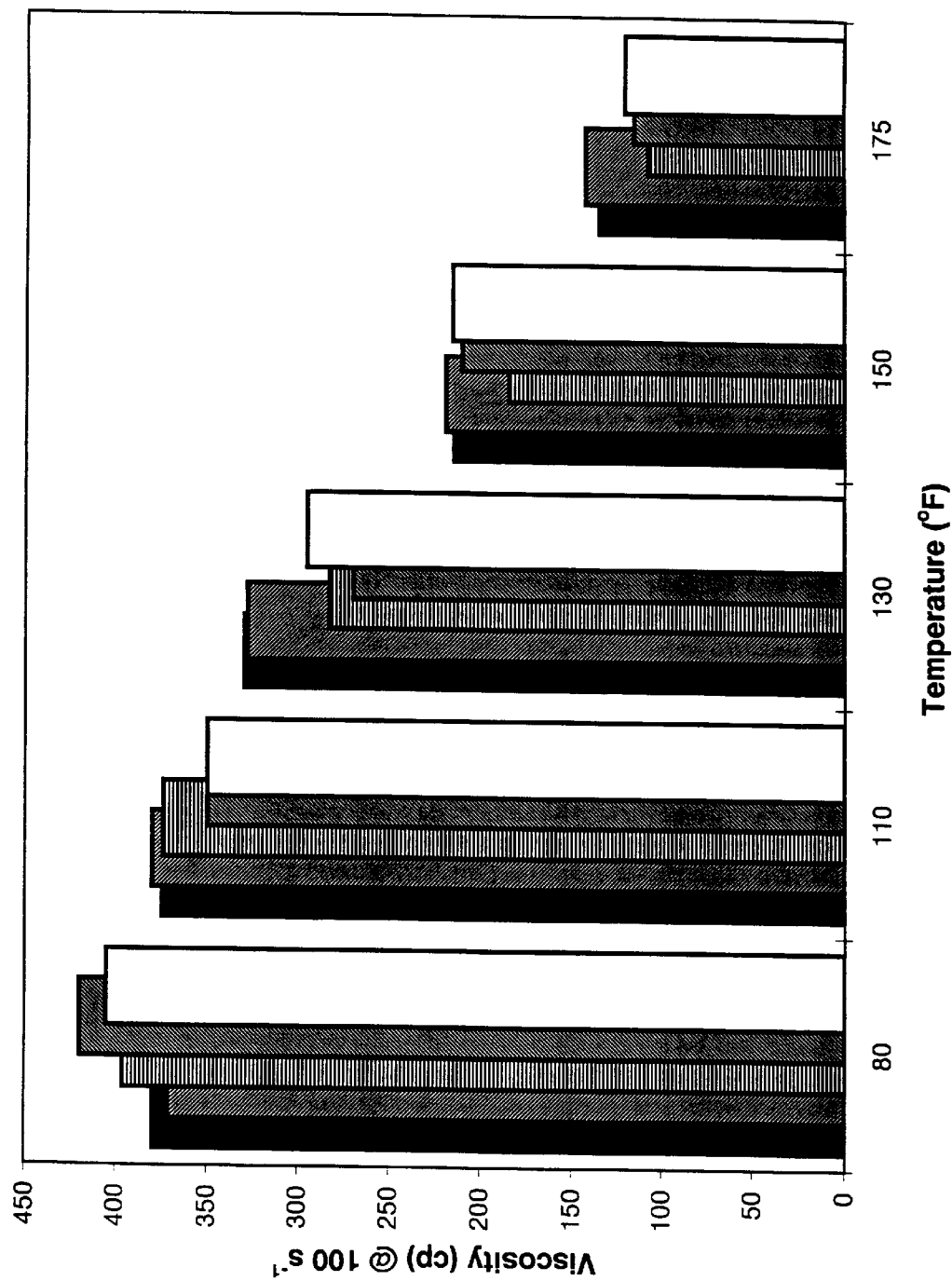
FIG. 14 shows the pH-independence of VES fluid (filled= pH2; left-to-right decreasing stripes=pH4; horizontal stripes=pH7; right-to-left decreasing stripes=pH8; open= pH9).

FIG. 14 shows the virtually complete (and surprising) insensitivity of the VES systems of the present Invention to pH. Therefore, the VES-based fluids are fully operable for their intended purpose in the presence of even strong (pH=2) acid solutions. This is a highly advantageous result since many reservoir engineers desire to perform fracturing treatments at low to very low pH, since, for instance, at high pH, insoluble hydroxides can form. Additionally, the data presented in FIG. 14 convincingly demonstrate that the VES-based fluids of the present Invention are useful in viscosifying acid, for use in matrix acidizing treatments.

While the invention has been described and illustrated herein by a limited number of embodiments, those skilled in the art will devise other embodiments which do not depart from the spirit of the invention as disclosed herein. Accordingly, the invention shall be limited in scope only by the attached claims.

What is claimed is:

1. A method for fracturing comprising injecting into a subterranean formation a fluid consisting essentially of:

an aqueous medium prepared at least substantially from seawater;

a quaternary ammonium salt having four R groups, $R_1$, $R_2$, $R_3$, and $R_4$, each bonded to a common nitrogen, wherein $R_1$, $R_2$, $R_3$, and $R_4$, are each the same or different, and are either —H or an aliphatic moiety having at least about 16 carbon atoms, which may be either branched or straight, and further which may be either saturated or unsaturated, and further wherein $R_2$ and $R_3$ may be each or both substituted with a functional group that imparts greater hydrophilicity to said ammonium salt;

a substantially water-soluble salt comprising a cation selected from the group consisting of alkali metal, alkaline earth metal, aluminum, zirconium, $Zn^{2+}$, $NH_4^+$, and $(CH_3)_4N^+$ and an anion selected from the group consisting of sulfate, nitrate, perchlorate and halide; and an organic stabilizer, said stabilizer in turn comprising a first functionality consisting of a member selected from the group consisting of an hydroxyl group and a carboxylate group, and a second functionality selected from the group consisting of a electron-donating functionality, and further wherein said first and second functionality are both attached to a ring structure, or separated by at least one double or triple bond.

2. The method of claim 1 wherein the substantially water soluble salt is selected from the group consisting of KCl and $NH_4Cl$.

3. The method of claim 1 wherein the fracturing fluid further comprises an organic anion.

4. The method of claim 3 wherein the organic anion comprises an aromatic ring and a functional group selected from a hydroxyl group, a sulfonaie group, and a carboxylate group.

5. The method of claim 3 wherein the organic anion comprises two functional groups each attached to a separate carbon atom, the two functional groups being selected from a hydroxyl group, a sulfonate group, and a carboxylate group.

6. A method for fracturing a subterranean formation comprising:

(a) providing an aqueous viscoelastic surfactant-based fracturing fluid, including a thickener comprising:

a solution medium selected from the group consisting of freshwater, seawater, a freshwater/seawater mixture;

an amount of a salt sufficient to provide formation stability;

at least one thickener in the fluid, the thickener being at least one member selected from the group consisting of (i) an amine corresponding to the formula

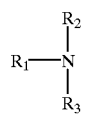

wherein $R_1$ is at least about a $C_{16}$ to about a $C_{22}$ group which may be aliphatic or aromatic, or some combination of the two, branched or straight chained and which may be saturated or unsaturated, $R_2$ and $R_3$ are each independently, hydrogen or a $C_1$ to about $C_6$ aliphatic group which can be branched or straight chained, saturated or unsaturated and which may be substituted with a group that renders the $R_2$ or $R_3$ group more hydrophilic, or (ii) an amine salt corresponding to the formula

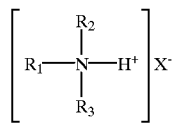

wherein $R_1$, $R_2$ and $R_3$ are the same as defined herein and $X^-$ is an anion, or (iii) a quaternary ammonium salt of an amine corresponding to the formula

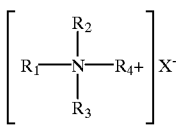

wherein $R_1$, $R_2$, $R_3$ and $X^-$ are the same as defined herein and $R_4$ constitutes a group which has been previously set forth for $R_3$, and none of $R_1, R_2, R_3$ or $R_4$ are hydrogen, and further wherein the $R_2$, $R_3$ and $R_4$ groups of the amine salt and quaternary ammonium salt may form a 5- or 6-member heterocyclic structure, wherein said structure includes the nitrogen atom of the amine;

(b) generating a viscous fluid comprising micelles;

(c) pumping the viscous fluid comprising micelles through a wellbore and into a formation at a pressure sufficient to fracture said formation; and (d) structurally altering the micelles within the fluid in the hydrocarbon zone, thereby decreasing the viscosity of the fluid in contact with hydrocarbon.

7. The method of claim 6 wherein said solution medium is seawater.

8. The method of claim 6 wherein $X^-$ is an organic anion.

9. The method of claim 4 wherein $X^-$ is moiety furnished by a member selected from the group consisting of guar, modified guar, galactomannan, glycomannan, and cellulose derivatives.

10. The method of claim 6 comprising the additional step of pumping a polymer-based fluid into said subterranean formation after said viscoelastic surfactant-based hydraulic fracturing fluid has been pumped into said formation.

11. The method of claim 9 wherein said guar or modified guar is slurried with a petroleum-based material.

12. The method of claim 11 wherein said material is diesel fuel.

13. The method of claim 8 wherein the concentration of said organic ion in said fluid is between about 0.05 and about 1.0%.

14. The method of claim 8 wherein said organic anion is in turn comprising a first functionality consisting of a member selected from the group consisting of an hydroxyl group and a carboxylate group, and a second functionality selected from the group consisting of a electron-donating functionality, and further wherein said first and second functionality are both attached to a ring structure, or separated by at least one double or triple bond.

15. The method of claim 6 wherein said salt is comprised of an anion selected from the group consisting of chloride, fluoride, bromide, nitrate, salicylate, phthalate, and combinations and permutations of the aforementioned group.

16. The method of claim 15 wherein said salt is comprised of between about 0.025 and 1.0% salicylate, and between about 3% and 4% chloride.

17. The method of claim 7 wherein said fluid is foamed using a gas selected from the group consisting of air, $CO_2$ and $N_2$.

18. The method of claim 6 comprising the additional step of blending with said viscoelastic surfactant-based hydraulic fracturing fluid, a polymer-based fluid after said viscoelastic-surfactant based fluid has been pumped into said formation.

19. The method of claim 18 wherein either or both of said fluids is foamed using a gas selected from the group consisting of $CO_2$ and $N_2$.

20. The method of claim 6 wherein said fracturing fluid has a pH of between about 1 and about 4.

21. The method of claim 6 further comprising pumping a polymer-based fluid into the formation while the viscous fracturing fluid is being pumped into the formation, wherein the polymer-based fluid comprises an aqueous medium and at least one of guar, modified guar, galactomannan, glycomannan, and cellulose derivatives.

22. The method of claim 21 wherein at least one of the viscous fracturing fluid and the polymer-based fluid is foamed using at least one of air, $CO_2$ and $N_2$.

23. A method according to claim 6, wherein the thickener is present in an effective amount to provide sufficient viscosity to suspend proppant during placement.

24. A method for acidizing a subterranean formation comprising:

(a) providing an aqueous viscoelastic surfactant-based fluid, including a thickener comprising:

a solution medium selected from the group consisting of freshwater, seawater, a freshwater/seawater mixture;

an amount of a salt sufficient to provide formation stability;

at least one thickener in the fluid, the thickener being at least one member selected from the group consisting of an amine corresponding to the formula

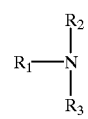

wherein $R_1$ is at least about a $C_{16}$ to about a $C_{22}$ aromatic or aliphatic group or some combination of both, and which may be branched or straight chained and which may be saturated or unsaturated, $R_2$ and $R_3$ are each independently, hydrogen or a $C_1$ to about $C_6$ aliphatic group which can be branched or straight chained, saturated or unsaturated and which may be substituted with a group that renders the $R_2$ or $R_3$ group more hydrophilic, or the amine salt corresponding to the formula

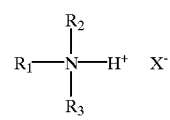

wherein $R_1$, $R_2$ and $R_3$ are the same as defined herein and $X^-$ is an anion, or a quaternary ammonium salt of the amine corresponding to the formula

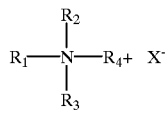

wherein $R_1$, $R_2$, $R_3$ and $X^-$ are the same as defined herein and $R_4$ constitutes a group which has been previously set forth for $R_3$, and none of $R_1$, $R_2$, $R_3$ or $R_4$ are hydrogen, and further wherein the $R_2$, $R_3$ and $R_4$ groups of the amine salt and quaternary ammonium salt may form a 5- or 6-member heterocyclic structure, wherein said structure includes the nitrogen atom of the amine;

(b) generating a viscous fluid comprising micelles; and (c) pumping the viscous fluid comprising micelles through a wellbore and into said formation.

25. The method of claim 24 wherein said salt is comprised of an organic ion.

26. The method of claim 24 wherein said aqueous medium is comprised substantially of seawater.

27. A method according to claim 24, wherein the thickener is present in an effective amount to provide sufficient viscosity to suspend proppant during placement.

\* \* \* \* \*